(12) United States Patent
Naoi et al.

(10) Patent No.: US 10,328,506 B2
(45) Date of Patent: Jun. 25, 2019

(54) RECIPROCATING TOOL

(71) Applicant: MAKITA CORPORATION, Anjo-shi, Aichi (JP)

(72) Inventors: Yosuke Naoi, Anjo (JP); Yasushi Ogura, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 15/625,369

(22) Filed: Jun. 16, 2017

(65) Prior Publication Data

US 2018/0021867 A1   Jan. 25, 2018

(30) Foreign Application Priority Data

Jul. 22, 2016 (JP) .................................. 2016-144798
Mar. 2, 2017 (JP) .................................. 2017-039686

(51) Int. Cl.

| B23D 49/16 | (2006.01) |
|---|---|
| B23D 51/16 | (2006.01) |
| B23D 51/02 | (2006.01) |

(52) U.S. Cl.
CPC ........... *B23D 49/162* (2013.01); *B23D 51/02* (2013.01); *B23D 51/16* (2013.01); *B23D 51/166* (2013.01)

(58) Field of Classification Search
CPC .... B23D 49/162; B23D 51/20; B23D 49/167; B23D 51/08; B23D 49/006; B23D 51/16; B23D 49/02; B26D 51/66; B26D 49/165; B25F 5/02; B23Q 5/027; Y10T 74/18296

USPC ............ 30/394, 392, 393, 273, 272; 83/747, 83/746.721, 699, 776, 697; 74/25, 27, 74/49, 55

See application file for complete search history.

(56) References Cited

U.S. PATENT DOCUMENTS

| 2,764,188 | A | * | 9/1956 | Hoffman | ............... | B23D 49/162 |
|---|---|---|---|---|---|---|
| | | | | | | 144/35.2 |
| 4,884,344 | A | * | 12/1989 | Martinez | ............... | B23D 49/165 |
| | | | | | | 30/273 |
| 5,940,977 | A | * | 8/1999 | Moores, Jr. | ............ | B23D 49/11 |
| | | | | | | 30/392 |
| 6,021,573 | A | * | 2/2000 | Kikuchi | .................. | B23D 49/02 |
| | | | | | | 30/392 |
| 8,261,455 | B2 | * | 9/2012 | Henrickson | ............ | B23D 51/16 |
| | | | | | | 30/392 |
| 2008/0189961 | A1 | * | 8/2008 | Oberheim | ............ | B23D 49/165 |
| | | | | | | 30/393 |
| 2011/0185582 | A1 | * | 8/2011 | Koeder | ................ | B23D 49/165 |
| | | | | | | 30/392 |

FOREIGN PATENT DOCUMENTS

JP        H05-37416 U      5/1993

* cited by examiner

*Primary Examiner* — Ghassem Alie
(74) *Attorney, Agent, or Firm* — Oliff PLC

(57) ABSTRACT

A reciprocating saw serving as reciprocating tool is equipped with a motor, a drive transmission mechanism that converts rotation of the motor into reciprocating motion, a rod that is connected to the drive transmission mechanism and that engages in reciprocating motion, and an upper roller and a lower roller that are capable of rolling and that have depressed portions that are capable of coming in contact with the rod, wherein the cross-section of the rod has no corners, and the depressed portions of the upper roller and the lower roller have hourglass-like profiles.

21 Claims, 20 Drawing Sheets

FIG.7
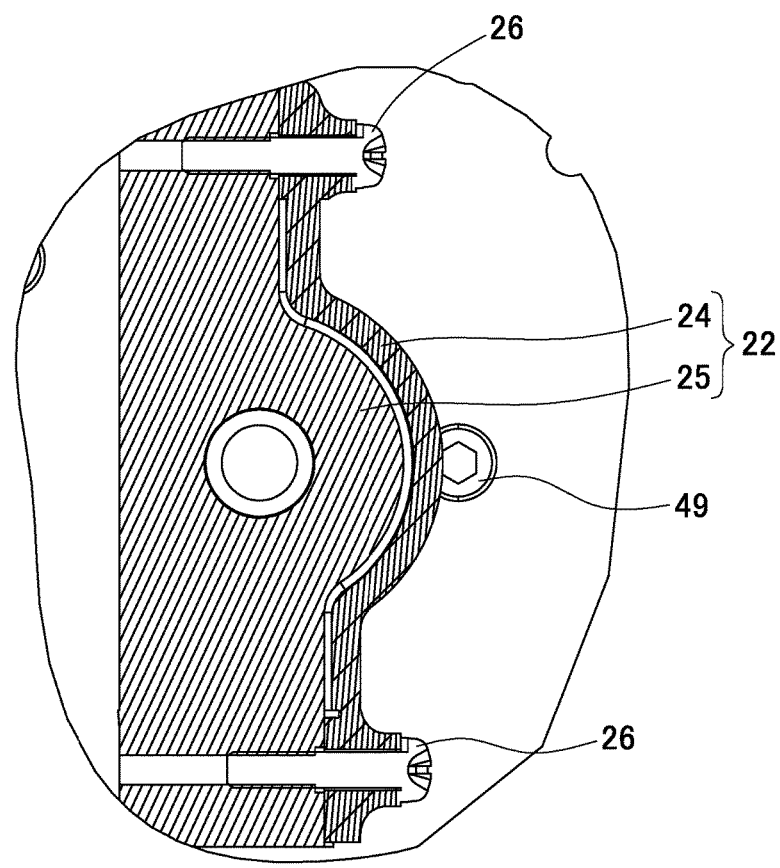
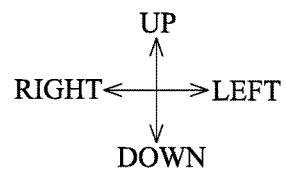

FIG.9
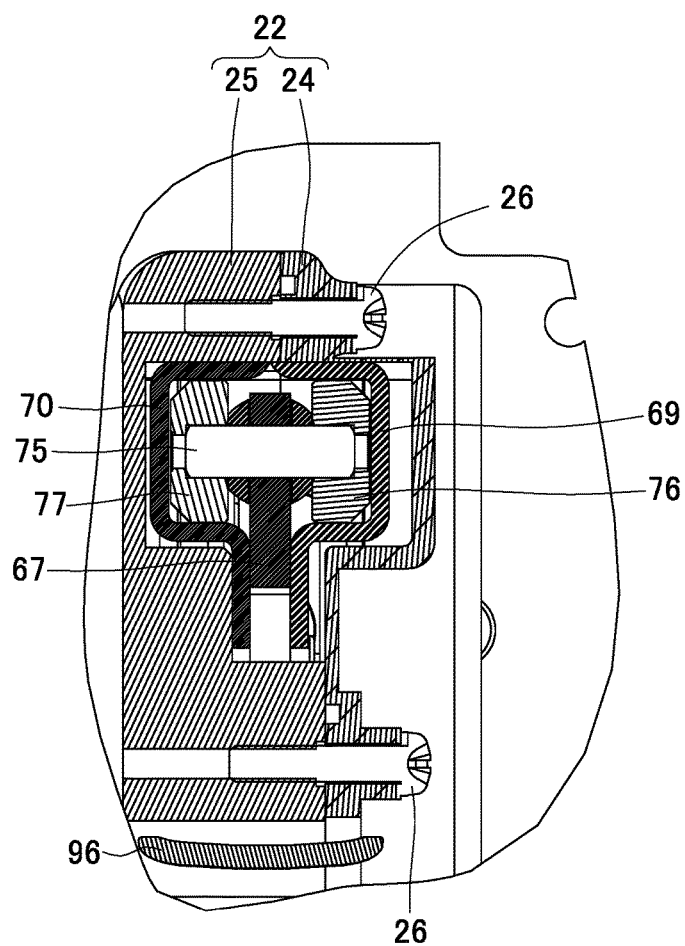
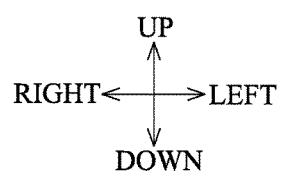

FIG.11
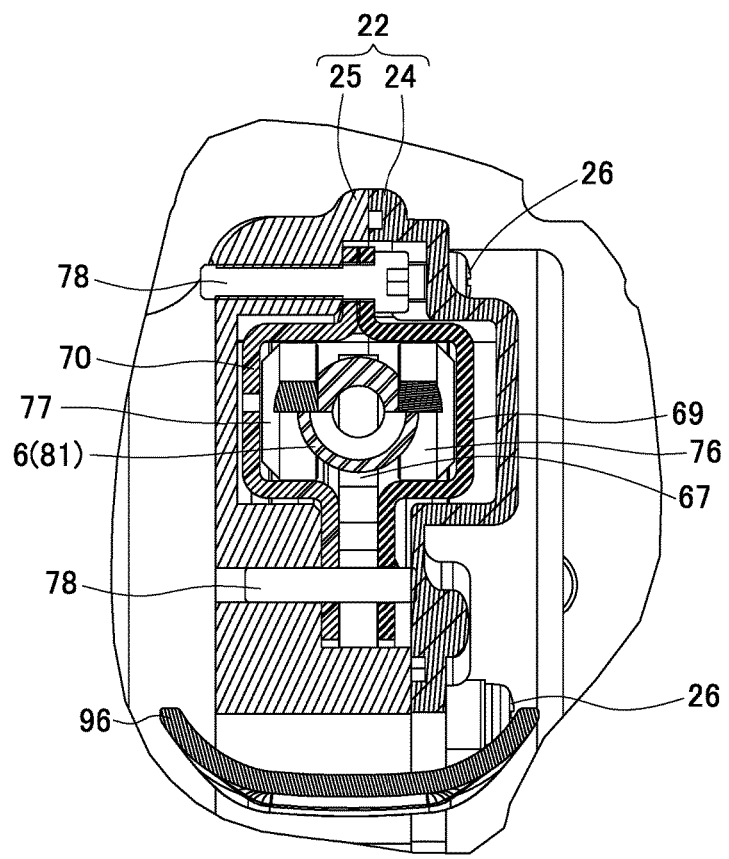
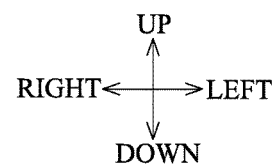

FIG.12
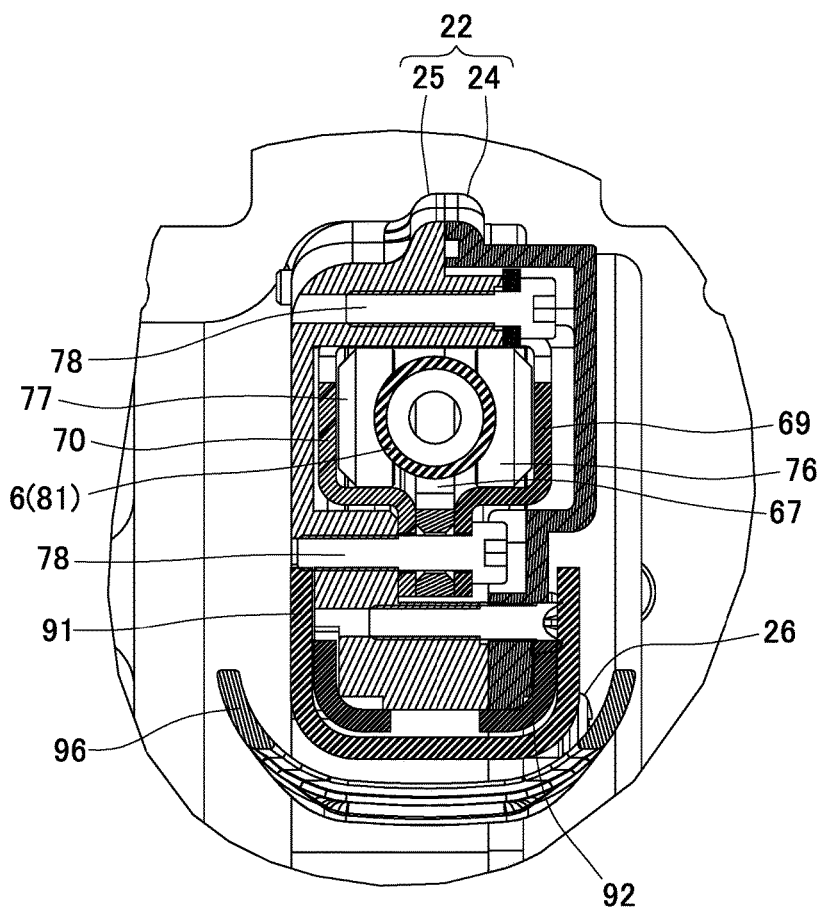
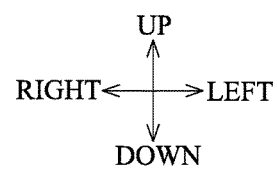

FIG.15
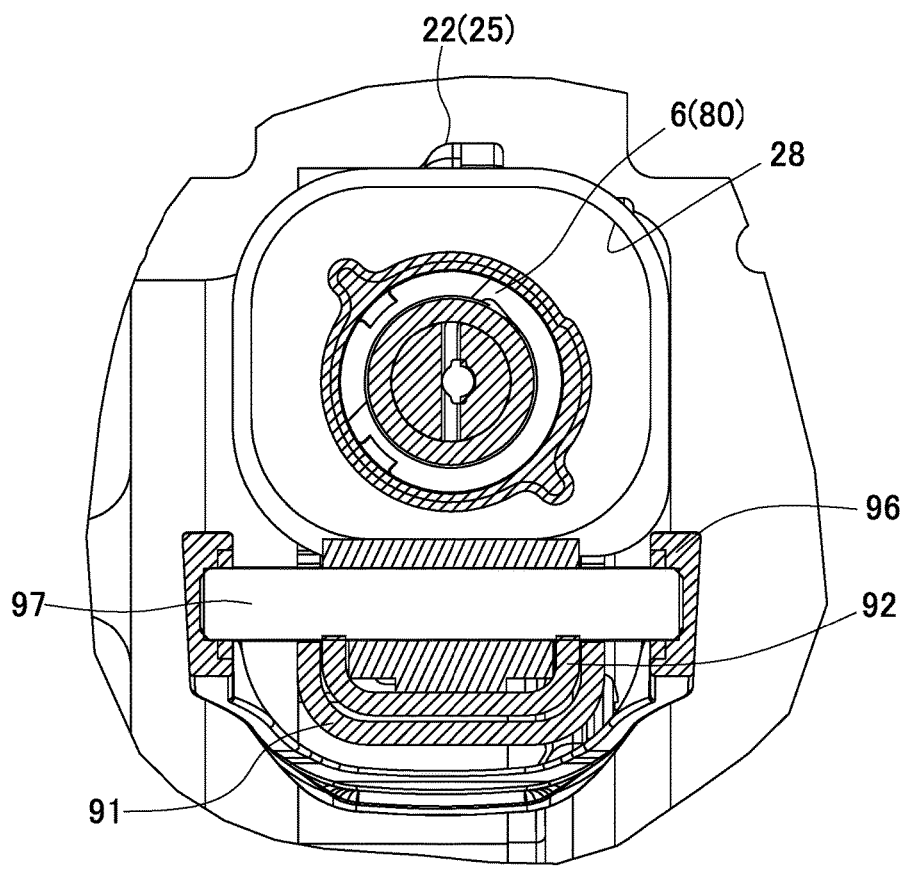
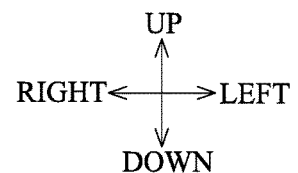

RECIPROCATING TOOL

BACKGROUND

This application claims the benefit of Japanese Patent Application Number 2016-144798 filed on Jul. 22, 2016 and Japanese Patent Application Number 2017-039686 filed on Mar. 2, 2017, the entirety of which is incorporated by reference.

TECHNICAL FIELD

The present invention relates to a reciprocating tool having an output unit that engages in reciprocating motion, a prominent example of which would be a reciprocating cutting tool that causes a blade to engage in reciprocating motion to cut a workpiece.

RELATED ART

As indicated in Japanese Utility Model Application Publication No. H05-37416, a reciprocating tool in which an actuating bar to which a saw blade is attached is made to engage in front-to-back/back-to-front reciprocating motion for performance of a task is known.

At this reciprocating tool, as the middle portion of the actuating bar which has a rectangular cross-section is surrounded by felt for protection against dust and a guide cylinder made from a wear-resistant alloy, it is supported in such fashion as to prevent it from moving in other than the front-to-back/back-to-front direction.

SUMMARY

With the reciprocating tool of Japanese Utility Model Application Publication No. H05-37416, because the guide cylinder is a sliding bearing, the actuating bar and the guide cylinder slide in the direction of translational motion, and there is much generation of heat and wear as compared with a roller bearing. Furthermore, the actuating bar having a rectangular cross-section, there are four corners that present pointed surfaces to the exterior. The sealing characteristics of the spaces between those corners and the guide cylinder which surrounds them as well as between the felt and the corners are comparatively inferior. Thus, it is possible for dust to enter the interior by way of the spaces between those corners and/or for oil from the interior to escape to the exterior.

It is therefore a primary object of the present invention to provide a reciprocating tool that makes it possible to simultaneously achieve a situation in which good sealing characteristics and suppression of wear and heat generation are ensured while at the same time having a mechanism that prevents a rod (actuating bar) which engages in reciprocating motion from moving in a direction other than the direction in which reciprocating motion occurs.

To primarily achieve the foregoing object, a reciprocating tool according to an aspect of the disclosure may include a motor, a reciprocating motion conversion mechanism that converts rotation of the motor into reciprocating motion, a rod that is connected to the reciprocating motion conversion mechanism and that engages in reciprocating motion, and a roller that is capable of rolling and that has a contacting portion capable of coming in contact with the rod. In the reciprocating tool, a cross-section of the rod may have no corners, and the contacting portion of the roller may have an hourglass profile.

It is preferable that the roller is one of a plurality thereof that are provided and that are arranged in mutually opposing fashion.

It is preferable that a movement-constraining plate is provided that constrains movement in an axial direction of the roller.

It is preferable that the cross-section of the rod is circular or oval.

It is preferable that the rod engages in front-to-back/back-to-front reciprocating motion, and the roller comes in contact with a rear portion of the rod when the rod is positioned at a front end of a range of reciprocating motion of the rod.

It is preferable that the reciprocating tool is equipped with a conversion mechanism housing at which the reciprocating motion conversion mechanism is arranged. In the reciprocating tool, the conversion mechanism housing is equipped with a plurality of conversion mechanism housing portions, at least two of the conversion mechanism housing portions are equipped with planar portions that mutually overlap, and at least one of the planar portions is provided with a sealing member which is an elastic body.

It is preferable that the rod has, at a back end portion thereof, a guide roller that is guided by a guide.

It is preferable that the reciprocating tool is equipped with a conversion mechanism housing at which the reciprocating motion conversion mechanism is arranged. In the reciprocating tool, the roller is supported so as to be capable of rolling around a roller shaft, and the roller shaft is rotatably supported with respect to the conversion mechanism housing.

It is preferable that the roller shaft is rotatably supported by an oilless bearing. The present invention provides the benefit whereby it is possible to provide a reciprocating tool that makes it possible to simultaneously achieve a situation in which good sealing characteristics and suppression of wear and heat generation are ensured while at the same time having a mechanism that prevents a slider which engages in reciprocating motion from moving in a direction other than the direction in which reciprocating motion occurs.

BRIEF DESCRIPTION OF DRAWINGS

FIG. 7 is a sectional view (some components not being shown) of section C-C in FIG. 2.

FIG. 9 is a sectional view (some components not being shown) of section E-E in FIG. 2.

FIG. 11 is a sectional view (some components not being shown) of section G-G in FIG. 2.

FIG. 12 is a sectional view (some components not being shown) of section H-H in FIG. 2.

FIG. 15 is a sectional view (some components not being shown) of section K-K in FIG. 3.

DETAILED DESCRIPTION

Below, embodiments of the present invention and variations thereon are described as appropriate with reference to the drawings.

Said embodiments are associated with a reciprocating cutting tool that serves as an example of a reciprocating tool. More specifically, said embodiments are associated with a reciprocating saw.

Note that the present invention is not limited to said embodiments and/or variations thereon.

First Embodiment

Figure 1:
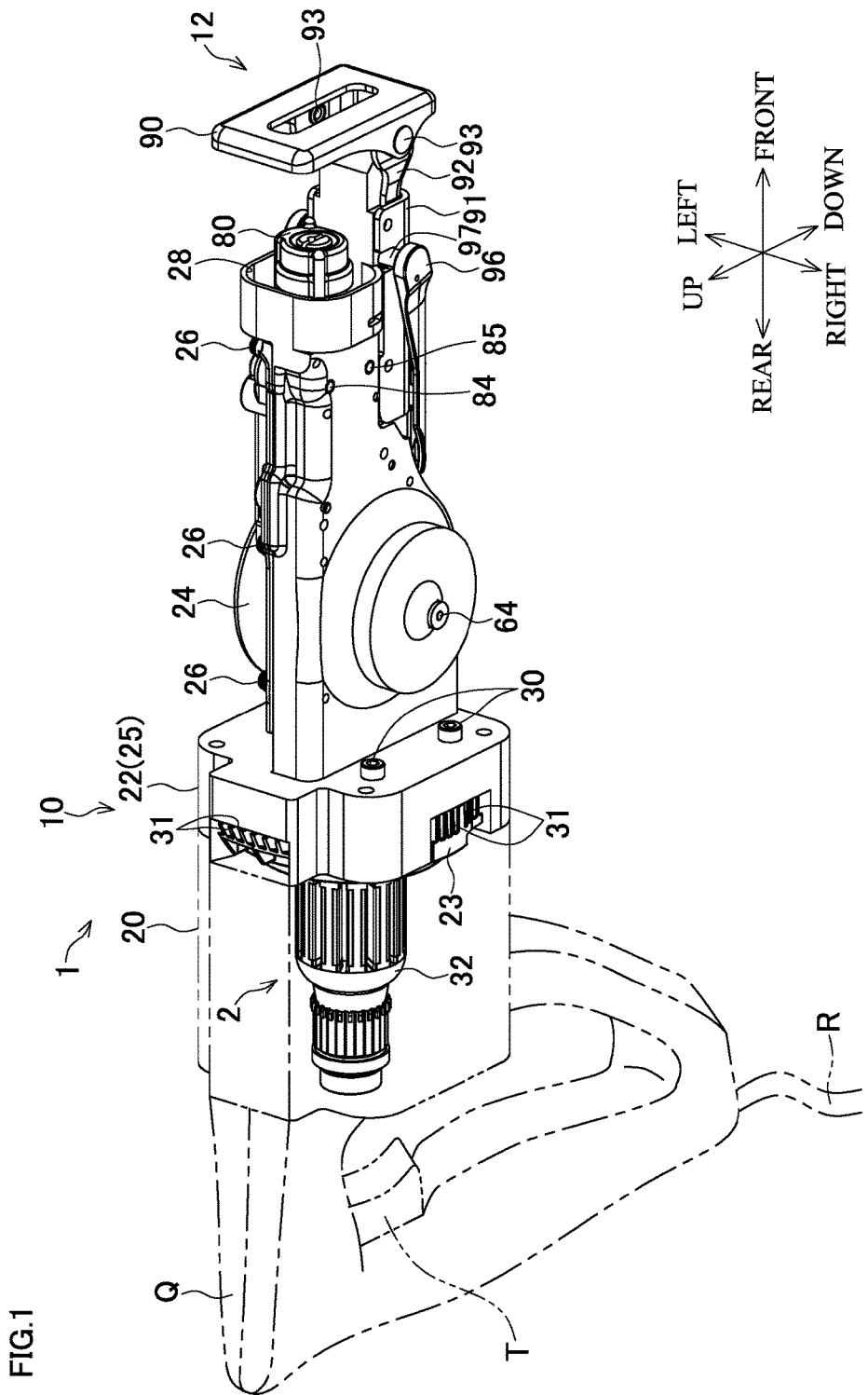
FIG. 1 is a perspective view of a reciprocating saw associated with a first embodiment of the present invention.
Figure 2:
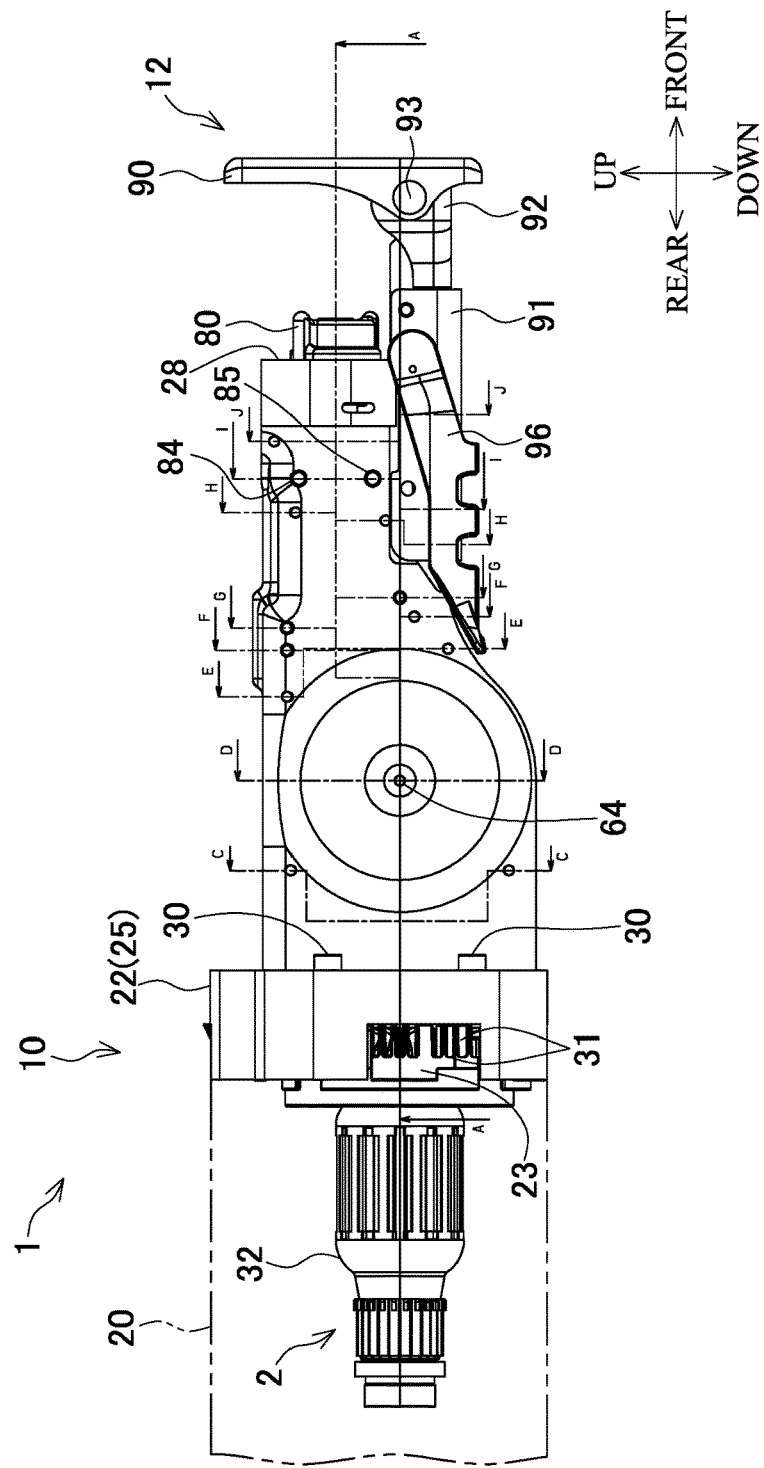
FIG. 2 is a right side view of FIG. 1.
Figure 3:
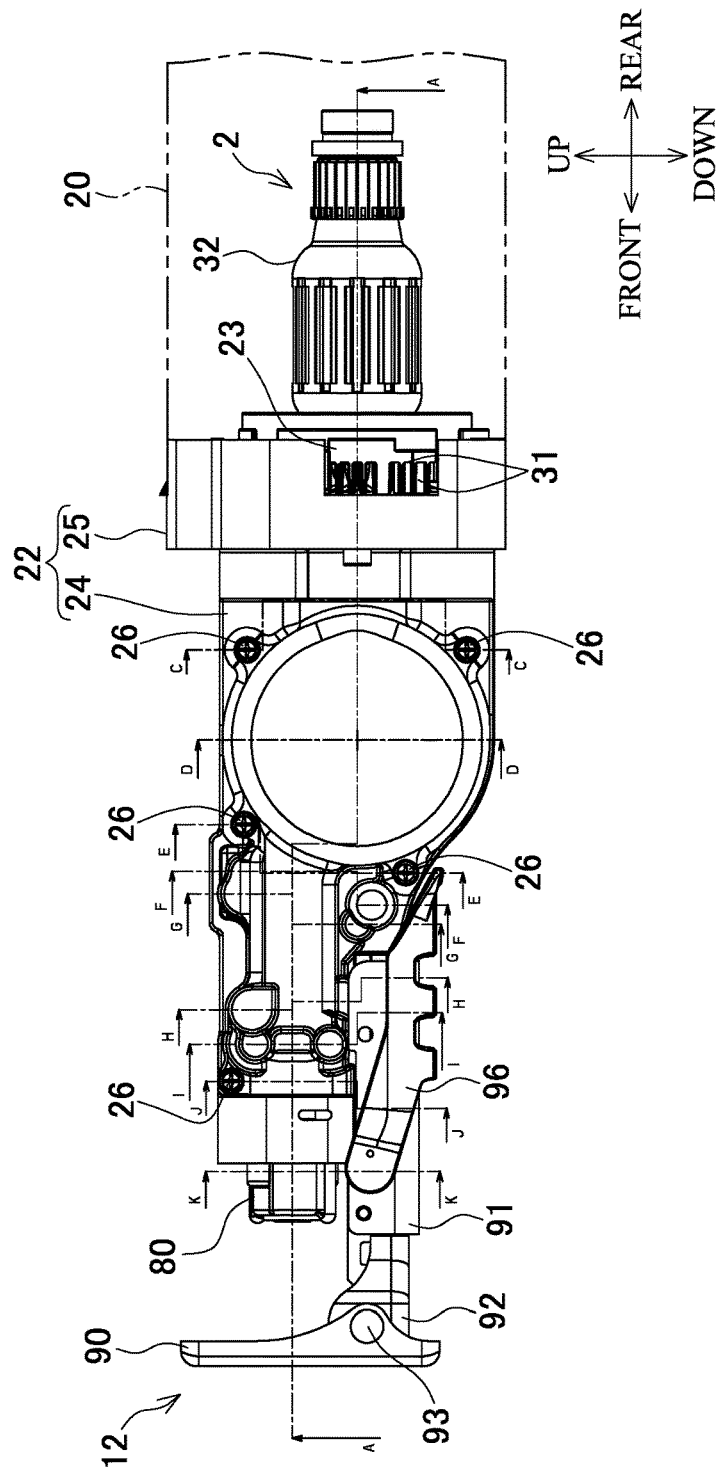
FIG. 3 is a left side view of FIG. 1.
Figure 4:
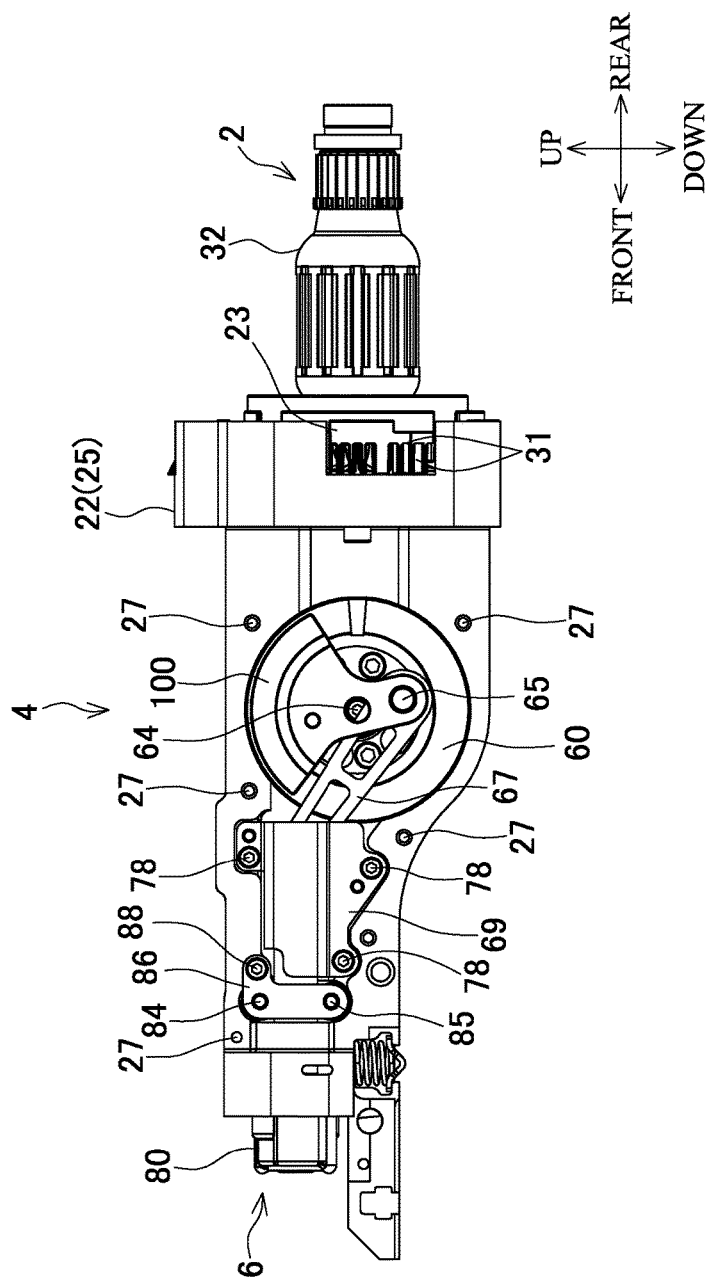
FIG. 4 is a left side view in which an outer covering has been partially removed to reveal the components therebelow in FIG. 1.
Figure 5:
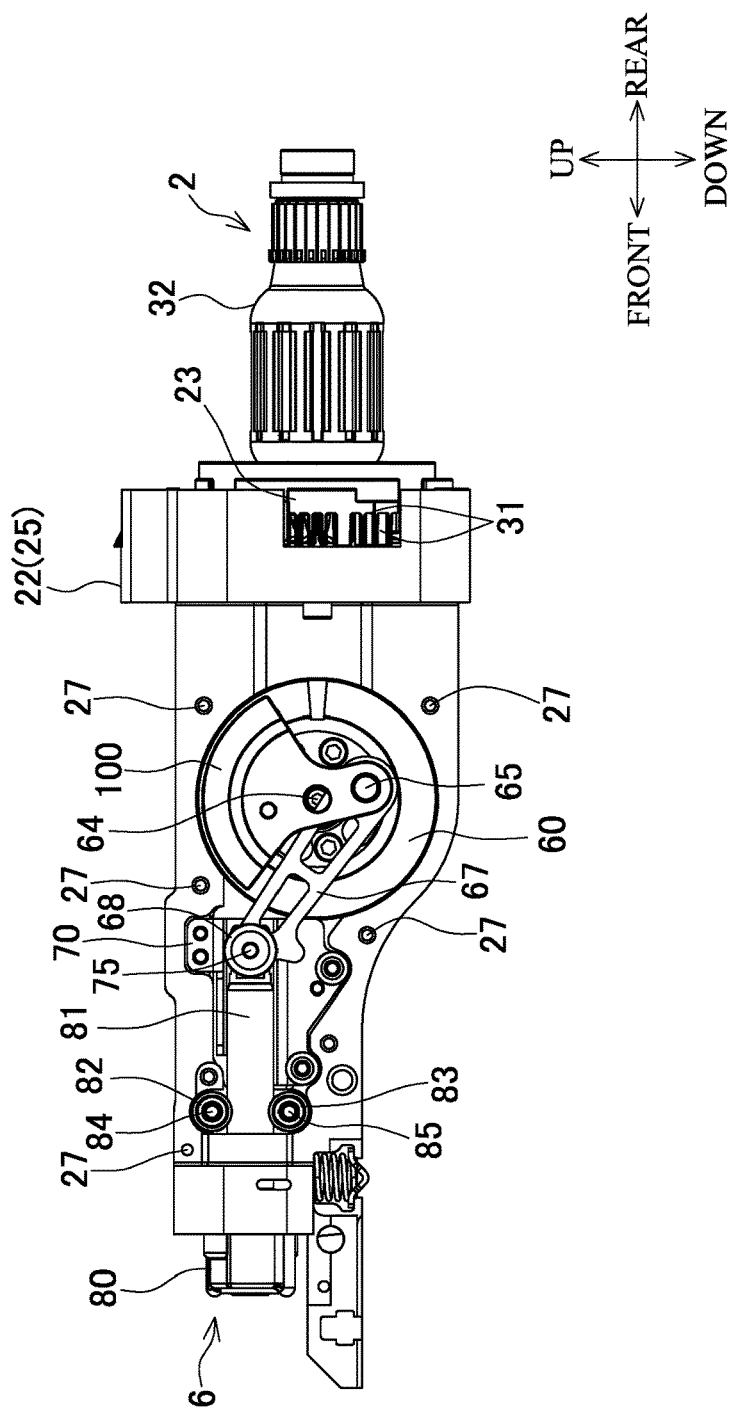
FIG. 5 is a left side view in which an outer covering has been partially removed to reveal the components therebelow in FIG. 4.
Figure 6:
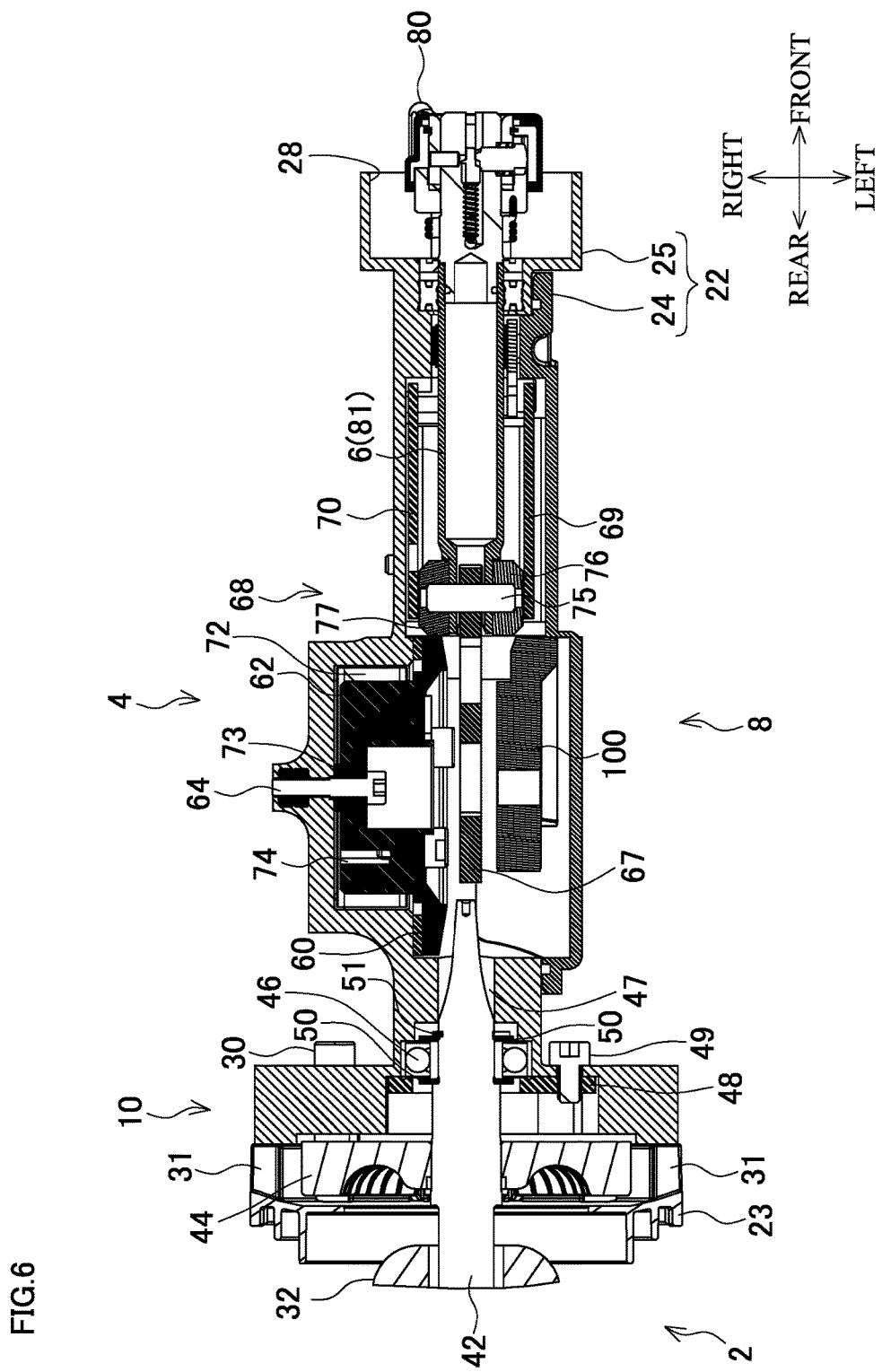
FIG. 6 is a sectional view of section A-A in FIG. 2.
Figure 8:
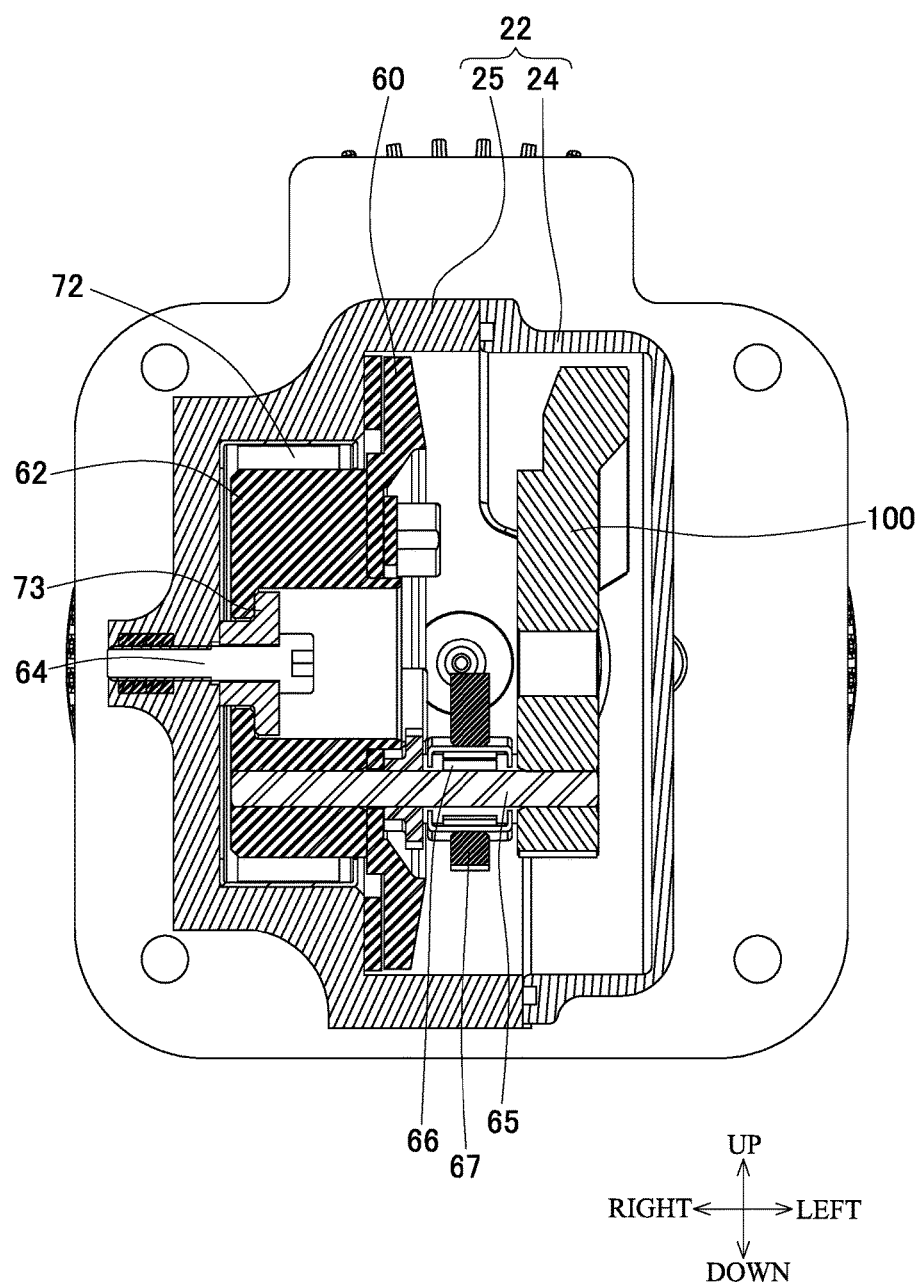
FIG. 8 is a sectional view (some components not being shown) of section D-D in FIG. 2.
Figure 10:
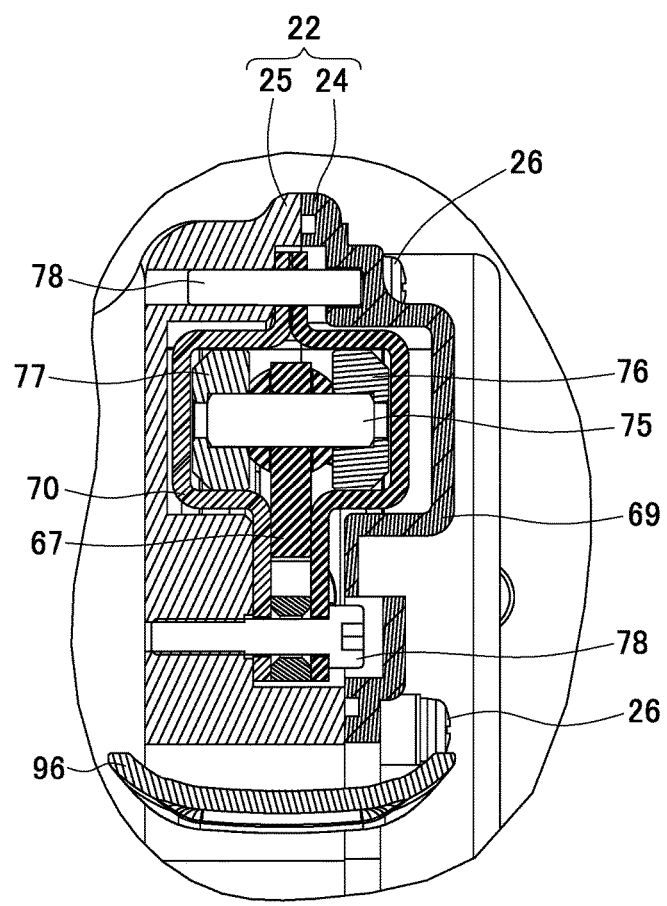
FIG. 10 is a sectional view (some components not being shown) of section F-F in FIG. 2.
Figure 13:
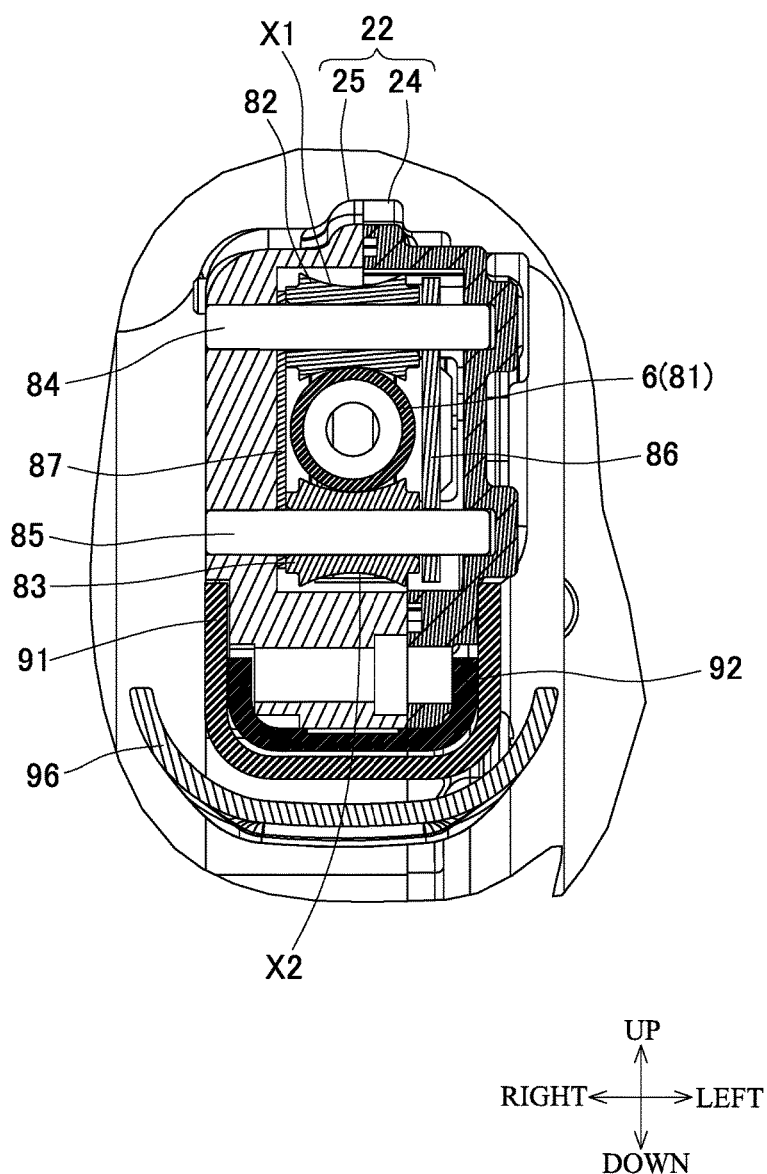
FIG. 13 is a sectional view (some components not being shown) of section I-I in FIG. 2.
Figure 14:
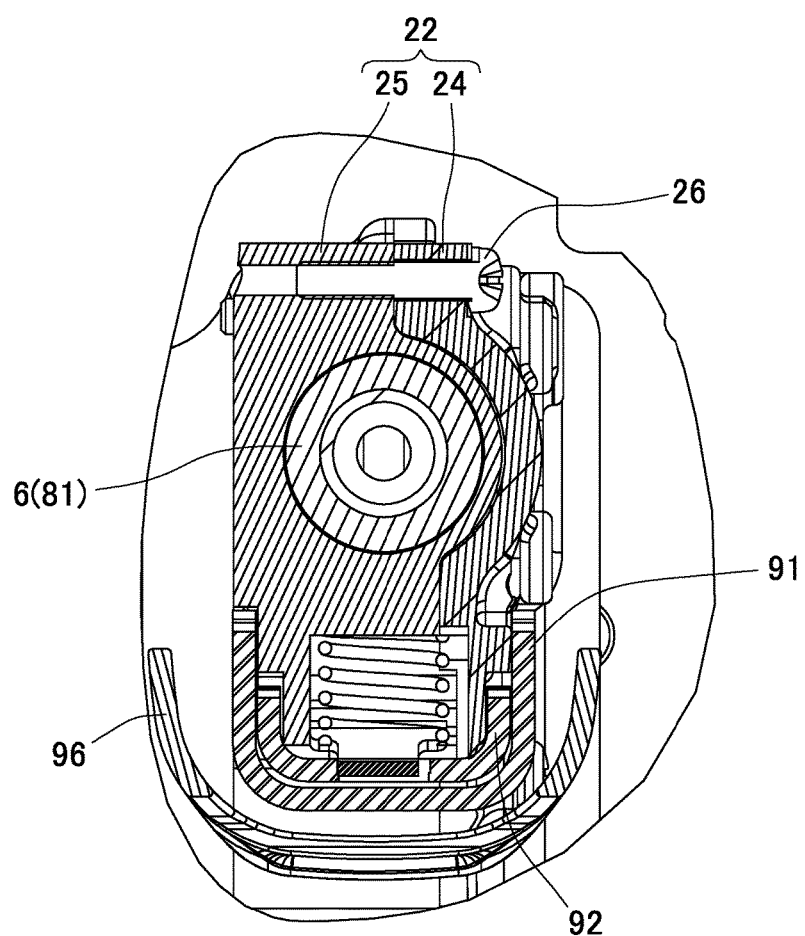
FIG. 14 is a sectional view (some components not being shown) of section J-J in FIG. 2.

FIG. 1 is a perspective view of a reciprocating saw 1 associated with a first embodiment of the present invention. FIG. 2 is a right side view of the reciprocating saw 1. FIG. 3 is a left side view of the reciprocating saw 1. FIG. 4 is a left side view in which an outer covering has been partially removed to reveal the components therebelow in the reciprocating saw 1. FIG. 5 is a left side view in which an outer covering in FIG. 4 has been partially removed to reveal the components therebelow. FIG. 6 is a sectional view of section A-A in FIG. 2. FIG. 7 is a sectional view (some components not being shown) of section C-C in FIG. 2. FIG. 8 is a sectional view (some components not being shown) of section D-D in FIG. 2. FIG. 9 is a sectional view (some components not being shown) of section E-E in FIG. 2. FIG. 10 is a sectional view (some components not being shown) of section F-F in FIG. 2. FIG. 11 is a sectional view (some components not being shown) of section G-G in FIG. 2. FIG. 12 is a sectional view (some components not being shown) of section H-H in FIG. 2. FIG. 13 is a sectional view (some components not being shown) of section I-I in FIG. 2. FIG. 14 is a sectional view (some components not being shown) of section J-J in FIG. 2. FIG. 15 is a sectional view (some components not being shown) of section K-K in FIG. 3.

At FIG. 2, note that the front of the reciprocating saw 1 is shown at right in the drawing, and the top of the reciprocating saw 1 is shown at the top in the drawing. The various directions having been established for convenience of description, they may in practice be varied to suit the inclination of the worker and/or workpiece or the like.

The reciprocating saw 1 has a drive mechanism 2, a drive transmission mechanism 4 serving as a reciprocating motion conversion mechanism, a rod 6 that serves as a final output shaft which is connected to the drive transmission mechanism 4, a counterweight mechanism 8 that may be combined with the drive transmission mechanism 4, a housing 10 that serves as a support frame for the various components, and a guide shoe 12 that is arranged at a location to the front of and below the rod 6.

The housing 10 comprises a main housing 20 that encloses the drive mechanism 2, a gear housing 22 that is disposed toward the front from the main housing 20 and that encloses the drive transmission mechanism 4, the rod 6, and the counterweight mechanism 8, and further comprises a motor front housing 23 that is disposed in intervening fashion therebetween.

The rear portion of main housing 20 which is shown in schematic fashion in FIG. 1 is formed in the shape of a loop, the rear portion of the loop constituting a handle portion Q that extends in the top-to-bottom/bottom-to-top direction. A trigger switch T, which is a trigger-operated switch, is arranged toward the front from the handle portion Q.

The gear housing 22 which serves as a conversion mechanism housing is divided into left and right sections such that it is equipped with a left gear housing portion 24 and a right gear housing portion 25. The left gear housing portion 24 which serves as a first conversion mechanism housing portion occupies the left portion of the gear housing 22. The right gear housing portion 25 which serves as a second conversion mechanism housing portion occupies the front portion, rear portion, and right portion of the gear housing 22 (see FIG. 6 and so forth). That is, the gear housing 22 is formed in such fashion that a region toward the left from the right gear housing portion 25 which is open to the left is covered by the left gear housing portion 24. The left gear housing portion 24 being smaller than the right gear housing portion 25, these are not split in the sense of being split into two mutually equal halves. By inserting screws 26, 26, . . . through screw holes 27, 27, . . . formed in the right gear housing portion 25, the left gear housing portion 24 is secured by means of screws to the right gear housing portion 25.

Furthermore, a blade clamp cover portion 28, which is arranged at the front end portion of the gear housing 22, is open to the front and in the shape of a cylinder which is closed at one end. The back end portion of the blade clamp cover portion 28 is closed off in such fashion that the rod 6 is inserted therewithin, preventing a situation whereby the hand of a worker or the like could be inserted within the gear housing 22.

The back end portion of the gear housing 22 (the right gear housing portion 25) is secured to the front end portion of the main housing 20 by means of a plurality of bolts 30, 30, . . . extending in the front-to-back/back-to-front direction.

Exhaust holes 31, 31, . . . are formed (at top, bottom, left, and right) in the motor front housing 23.

The drive mechanism 2 has an electric motor 32. A rotationally driven shaft 42 of the motor 32 is oriented in the front-to-back/back-to-front direction, the front portion thereof protruding to the front. Teeth are formed peripherally about the front end portion of the rotationally driven shaft 42.

The motor 32 is electrically connected to the trigger switch T and to a cord R, electricity being supplied from the cord R (electric power source) and the rotationally driven shaft 42 being driven when the trigger switch T is turned ON (the trigger is depressed).

An axial flow fan 44 is arranged toward the exterior at the rear at an exposed portion toward the front of the rotationally driven shaft 42. The axial flow fan 44 rotates to push air to the exterior. The fan 44 is secured to the rotationally driven shaft 42. The exhaust holes 31, 31, . . . are disposed toward the exterior from the fan 44.

A bearing 46 is arranged in a region about the rotationally driven shaft 42 and to the front of the 44. The bearing 46 rotatably supports the rotationally driven shaft 42 and is arranged within the central portion of a hole 47 extending in the front-to-back/back-to-front direction which is formed centrally in the back end portion of the right gear housing portion 25. The hole 47 is formed such that a central portion thereof is wider in the top-to-bottom/bottom-to-top and left-to-right/right-to-left directions than a front portion thereof, and such that a back portion thereof is still wider in the top-to-bottom/bottom-to-top and left-to-right/right-to-left directions than the central portion thereof. The front face of an outer race of the bearing 46 abuts a step face at the boundary between the front portion thereof and the central portion thereof. The back face of the outer race of the bearing 46 is arranged so as to be continuous with a step face at the boundary between the central portion thereof and the back portion thereof. The bearing 46 is secured by means of a plate 48 (bearing retainer) that abuts the step face toward the back of the hole 47 and the back face of the outer race of the bearing 46, retaining this so that it does not move toward the motor 32. The plate 48 is secured to the back end portion of the right gear housing portion 25 by a bolt 49. Respectively arranged at the front and the back of the inner race of the bearing 46 are washers 50, a circlip 51 being arranged toward the front from the front washer 50, the bearing 46 being secured relative to the rotationally driven shaft 42 by means thereof.

The drive transmission mechanism 4 includes a gear 60, a rotating portion 62, a supporting shaft 64, an arm-like slider 67, a guide roller 68, and a left guide 69 and a right guide 70. The gear 60 is of discoid shape, the girth of which extends in the front-to-back/back-to-front and top-to-bottom/bottom-to-top directions. The gear 60 has a round hole at an interior central portion of a bevel gear, an outer edge portion of which meshes with a tooth at a tip portion of the rotationally driven shaft 42. The rotating portion 62 is of cylindrical shape, the axial direction of which is the left-to-right/right-to-left direction and a left portion of which enters the round hole of the gear 60. The rotating portion 62 is arranged toward the right from the gear 60 and that is integral with the gear 60. The supporting shaft 64 extending in the left-to-right/right-to-left direction passes centrally through the right portion of the rotating portion 62. The arm-like slider 67 that is of columnar shape protrudes in integral fashion with the gear 60 from a left face peripheral portion of the gear 60. The slider 67 is connected by way of a bearing (needle bearing) 66 (FIG. 8) installed toward the exterior from a shaft 65 extending in the left-to-right/right-to-left direction. The guide roller 68 is arranged at a back end portion of the rod 6 and is connected at an end portion (front end portion) at the end opposite the shaft 65 connection portion (back end portion) at the slider 67. The left guide 69 and a right guide 70 are arranged toward the exterior at left and right at the guide roller 68.

Note that at least a portion of the slider 67, the bearing 66, the guide roller 68, the left guide 69, and the right guide 70 may be treated not as constituent element(s) of the drive transmission mechanism 4 but as constituent element(s) of the output unit (the rod 6).

The rotating portion 62 is capable of rotating about the supporting shaft 64 together with the gear 60. A rotating portion bearing (needle bearing) 72 is arranged at the exterior of the cylindrical surface of the rotating portion 62 and rotatably supports the rotating portion 62. The rotating portion bearing 72 is attached to the right gear housing portion 25. Because the diameter (number of teeth) at the gear 60 is greater than the diameter (number of teeth) at the rotationally driven shaft 42 of the motor 32, the rotational speed of the rotationally driven shaft 42 is reduced by the gear 60. A flanged cylindrical retainer 73 is disposed in intervening fashion between the rotating portion 62 and the supporting shaft 64.

The rotating portion 62 is equipped with a recessed portion (not shown) which is recessed toward the left from the right face, permitting this to be made light in weight (thin-walled) to a corresponding degree.

The shaft 65 protrudes from a location that is eccentric with respect to the center of rotation of the gear 60.

The guide roller 68 is equipped with a guide roller shaft 75 extending in the left-to-right/right-to-left direction that passes through the front end portion of the slider 67, and a left guide roller 76 and a right guide roller 77 that are rotatably attached to the left end portion and the right end portion of the guide roller shaft 75. The front end portion of the slider 67 enters the back end portion of the rod 6, and the guide roller shaft 75 also passes through the back end portion of the rod 6. The guide roller shaft 75, which is inserted within a hole extending in the left-to-right/right-to-left direction formed in the rod 6, is capable of rotating relative to the rod 6. The guide roller shaft 75, which has been provided with retaining features that prevent it from coming free from the rod 6, is capable of engaging in front-to-back/back-to-front movement together with the rod 6.

The left guide 69, which extends from front to back, has, at a central portion in the top-to-bottom/bottom-to-top direction thereof, a grooved portion extending in the front-to-back/back-to-front direction. The grooved portion forms a depression to the left and is open to the right. The left guide 69 has a topside portion that extends upwardly from a top face of the grooved portion, and has a bottomside portion that extends downwardly from a bottom face thereof. The right guide 70 is formed so as to have a shape that is more or less symmetric about a plane with respect to the left guide 69. The right guide 70 has a grooved portion that forms a depression to the right and that is open to the left, and further has a topside portion and a bottomside portion. The left guide 69 and the right guide 70 face each other in such fashion that their respective topside portions are mutually aligned. At this time, the respective bottomside portions thereof have a gap therebetween that is on the order of the size in the left-to-right/right-to-left direction of the slider 67. The left guide 69 and the right guide 70 are secured by means of a plurality of screws 78, 78, . . . that extend from the left guide 69 and through the right guide 70 to reach the right gear housing portion 25. The screws 78, 78, . . . pass through the topside portion and/or the bottomside portion of the left guide 69 and the right guide 70.

When the gear 60 rotates and the shaft 65 is displaced (made to revolve), the component of displacement in the front-to-back/back-to-front direction of the shaft 65 is transmitted to the slider 67. The guide roller 68 is therefore made to engage in front-to-back/back-to-front reciprocating motion by way of the slider 67. With respect to the component of displacement in the top-to-bottom/bottom-to-top direction that is produced during revolution of the shaft 65, note that as the guide roller 68 spins within the left guide 69 and the right guide 70, this is not transmitted to the guide roller 68.

The rod 6 is a member that extends in front-to-back/back-to-front fashion, a blade clamp 80 being provided at a front end portion thereof. The blade clamp 80 is of larger girth in the top-to-bottom/bottom-to-top and left-to-right/right-to-left directions than a round rod base portion 81 which is disposed toward the rear therefrom. Attached to the blade clamp 80 is a blade which is not shown in the drawings.

An upper roller 82 and a lower roller 83 are arranged at locations which are to the exterior of the rod base portion 81 and which are toward the front from the left guide 69 and the right guide 70 (FIG. 13).

The upper roller 82 extends in the left-to-right/right-to-left direction and takes the form of a spool that is equipped with a depressed portion X1 (contacting portion capable of coming in contact with the rod 6) having a locus which corresponds to one full revolution about an axis in the left-to-right/right-to-left direction. The depressed portion X1 of the upper roller 82 has an hourglass-like profile in the left-to-right/right-to-left direction, the central portion thereof being formed so as to have a depth which is greater than that at either the left portion or the right portion. The shape of a cross-section (section extending in the top-to-bottom/bottom-to-top and left-to-right/right-to-left directions as shown in FIG. 13) through the depressed portion X1 of the upper roller 82 is arcuate. The diameter of the arc of the upper roller 82 is similar to the diameter of the rod base portion 81, or is slightly larger than the diameter of the rod base portion 81 if considered microscopically. The upper roller 82 comes in contact with the top face of the rod base portion 81 at the lower portion of the depressed portion (hourglass-shaped portion) X1.

The lower roller 83, in similar fashion with respect to the upper roller 82, comes in contact with the bottom face of the rod base portion 81 at the upper portion of a depressed portion X2 (hourglass-shaped portion and contacting portion) therein.

The upper roller 82 is supported so as to be capable of rolling around an upper roller shaft 84 that is arranged coaxially with respect to the axis of the upper roller 82. The left portion of the upper roller shaft 84 is supported by the left gear housing portion 24, and the right portion of the upper roller shaft 84 is supported by a roller right plate 87, described below.

The lower roller 83, like the upper roller 82, is supported so as to be capable of rolling around a lower roller shaft 85. The lower roller shaft 85 is supported in similar fashion as the upper roller shaft 84.

A roller left plate 86 comprising sheet metal is arranged toward the left from the upper roller 82 and the lower roller 83. The roller left plate 86 extends in the front-to-back/back-to-front and top-to-bottom/bottom-to-top directions. A roller right plate 87 comprising sheet metal is arranged toward the right from the upper roller 82 and the lower roller 83. The roller right plate 87 extends in the front-to-back/back-to-front and top-to-bottom/bottom-to-top directions. The upper roller shaft 84 and/or the lower roller shaft 85 pass through the upper portion and/or the lower portion of the roller left plate 86 and/or the roller right plate 87. The roller left plate 86 constrains movement (eliminates play) of the upper roller 82 and the lower roller 83 so as to prevent movement to the left from a prescribed location, and the roller right plate 87 (movement-constraining plate) constrains movement of the upper roller 82 and the lower roller 83 so as to prevent movement to the right from a prescribed location. The roller left plate 86 is secured to the right gear housing portion 25 by means of a screw 88 (FIG. 4). The roller right plate 87 is supported by the right gear housing portion 25.

The rod 6, being guided by the upper roller 82 and the lower roller 83, is capable of movement in the front-to-back/back-to-front direction. When the rod 6 moves in the front-to-back/back-to-front direction, the upper roller 82 and the lower roller 83 rotate about the upper roller shaft 84 and the lower roller shaft 85.

The guide roller shaft 75 is connected to the rod base portion 81, and the rod 6 is guided in the front-to-back/back-to-front direction by the guide roller 68, reciprocating motion being made to occur by means of the slider 67 which is connected to the guide roller shaft 75.

The blade passes through the guide shoe 12. The guide shoe 12 has a shoe plate 90 that is capable of coming in contact with a workpiece, a shoe supporter cover 91 that is secured to the right gear housing portion 25, a shoe supporter 92 that is arranged toward the interior from the shoe supporter cover 91, and left and right pins 93, 93 that are arranged at the front end portion of the shoe supporter 92 and that support the shoe plate 90 in such fashion as to permit it to pivot about an axis in the left-to-right/right-to-left direction.

The shoe supporter 92 and the shoe supporter cover 91 respectively have U-shaped cross-sections and are arranged at the front bottom portion of the gear housing 22. The shoe supporter 92 is arranged in such fashion as to be capable of sliding in the front-to-back/back-to-front direction at a location toward the interior from the shoe supporter cover 91. Note that the shoe supporter cover 91 is included within the housing 10.

A shoe lever 96 is arranged toward the exterior from the shoe supporter cover 91. The shoe lever 96 is equipped with a shoe supporter stationary shaft 97 that extends in the left-to-right/right-to-left direction and that passes through a region above the shoe supporter cover 91 and the shoe supporter 92. The shoe lever 96 is capable of rotating about the shoe supporter stationary shaft 97 and is capable of assuming an opened and closed state with respect to the shoe supporter cover 91. When the shoe lever 96 is closed (the state in which it is oriented in the front-to-back/back-to-front direction as shown in the drawings), the shoe supporter stationary shaft 97 causes the shoe supporter 92 to be tightened and secured. When the shoe lever 96 is open (the state in which it is oriented in the top-to-bottom/bottom-to-top direction), this releases the tightening that the shoe supporter stationary shaft 97 had caused the shoe supporter 92 to experience. The shoe supporter 92 and the shoe plate 90 are permitted to slide in the front-to-back/back-to-front direction so that the positions thereof can be adjusted.

The counterweight mechanism 8 has a balancer 100 that is made of metal. The balancer 100 is shaped in such fashion that it appears to occupy a portion of a bowl-shaped region extending in the front-to-back/back-to-front and top-to-bottom/bottom-to-top directions. The balancer 100 has a fan-shaped portion that subtends a central angle of on the order of 100° as viewed from the left, and an arm-like portion that extends radially but on the side opposite from that central angle portion. The balancer 100 is supported in cantilever-like fashion by the shaft 65, being connected to the shaft 65 by virtue of the fact that the left end portion of the shaft 65 which is integral with the gear 60 at the drive transmission mechanism 4 is press-fit within a hole at the end portion of the arm-like portion that is opposite the fan-shaped portion. As viewed to the right from a location at left, the central angle portion of the balancer 100 and the central portion of the gear 60 overlap. A hole, which is provided at the central angle portion of the balancer 100, permits passage therethrough of a tool (screwdriver or the like) for attaching the supporting shaft 64.

The balancer 100 is integral with the gear 60 (the shaft 65), rotation of the gear 60 (revolution of the shaft 65) causing this to rotate about the central angle portion, i.e., the fan-shaped portion, as center. When the rod 6 is in its retracted position (the position shown in the respective drawings), the shaft 65 will be positioned toward the back and the fan-shaped portion of the balancer 100 will be positioned toward the front. When the rod 6 is in its extended position, the shaft 65 will be positioned toward the front and the fan-shaped portion of the balancer 100 will be positioned toward the back. The weight and location of the center of gravity of the fan-shaped portion (weighted portion) of the balancer 100 are chosen so as to minimize vibration of the rod 6 and of the blade and the slider 67, the balancer 100 (weighted portion) serving as a counterweight by virtue of the fact that it actuates in reverse fashion to the front-to-back/back-to-front motion of the rod 6 and so forth.

Exemplary operation of such a reciprocating saw 1 will now be described. With the rod 6 stopped, an operator installs a blade thereon in such fashion that the teeth of the blade face downward, and causes the front face of the shoe plate 90 of the guide shoe 12 to abut a workpiece. In addition, with the cord R connected to a power source, the operator grips the handle portion Q and turns ON the trigger switch T. Accordingly, electricity is supplied to the motor 32, and the rotationally driven shaft 42 rotates, so that the gear 60 rotates and the rod 6 engages in front-to-back/back-to-front motion by way of the slider 67. Furthermore, the weighted portion of the balancer 100 moves opposite the rod 6 in the front-to-back/back-to-front direction, and the rod 6 engages in front-to-back/back-to-front motion in such fashion that vibration is suppressed.

By means of not only the guide roller 68 within the right guide 70 and the left guide 69 but also the upper roller 82 and the lower roller 83, the rod 6 is guided in such fashion as not to be directed in a direction other than the front-to-back/back-to-front, i.e., in such fashion that movement (including any change in orientation) other than the direction in which reciprocating motion occurs is prevented.

Because the cross-section of the rod 6 has no corners and is circular, and because the upper roller 82 and the lower roller 83 have hourglass-like profiles and have the depressed portions X1 and X2, this makes it possible for the rod 6 to come in contact with the upper roller 82 and/or the lower roller 83 in continuous fashion, such that there are no corners therebetween, permitting excellent sealing characteristics. Furthermore, because the upper roller 82 and the lower roller 83 roll around the upper roller shaft 84 and the lower roller shaft 85, they are able to smoothly guide the front-to-back/back-to-front motion of the rod 6, and the circulation of lubricant which results therefrom also prevents seizing of parts.

Moreover, because the depressed portions X1 and X2 have hourglass-like profiles, they are capable of supporting the load that bears thereon from the rod 6, in particular, loads in the left-to-right/right-to-left direction. The rod 6 is naturally guided to the deepest portion (center) of the hourglass-shaped portion. Furthermore, when considered from a microscopic perspective, rotation of the upper roller 82 and the lower roller 83 occurs in such fashion that the majority of the load is borne as a result of there having been complete in contact with the rod 6 (the rod base portion 81) at a point or a short line in the front-to-back/back-to-front direction.

Accordingly, there is reduced tendency to experience adverse effect due to heat from friction or wear. As a result, generation of heat and wear among the upper roller 82 and the lower roller 83, or the rod 6 are prevented, and endurance thereof is improved.

When the rod 6 which engages in front-to-back/back-to-front reciprocating motion is at its frontmost position, the upper roller 82 and the lower roller 83 come in contact with the rear portion of the rod 6 and support the load of the rear portion of the rod 6. When the rod 6 is at its rearmost position, the upper roller 82 and the lower roller 83 come in contact with the front portion of the rod 6 and support the load of the front portion of the rod 6.

Furthermore, rotation of the rotationally driven shaft 42 of the motor 32 causes the fan 44 to rotate, generating flow of air from fan 44 to exhaust holes 31, 31, . . . . Furthermore, generation of this flow of air causes formation of flow of air from the exterior that passes through gap(s) between the gear housing 22 and the main housing 20 to reach the fan 44. The components that are supported by the gear housing 22 and the main housing 20 are therefore cooled by air.

When the operator lowers the handle portion Q while the rod 6 and the blade are operational, the teeth of the blade which are moving front-to-back/back-to-front hit the workpiece, and the workpiece is cut, the cutting direction being the top-to-bottom/bottom-to-top direction.

When the operator turns OFF the switch T, the rotationally driven shaft 42 of the motor 32 stops, and the various front-to-back/back-to-front motions stop.

A reciprocating saw 1 in accordance with the first embodiment is equipped with a motor 32, a drive transmission mechanism 4 that converts rotation of the motor 32 into reciprocating motion, a rod 6 that is connected to the drive transmission mechanism 4 and that engages in reciprocating motion, and an upper roller 82 and a lower roller 83 that are capable of rolling and that have depressed portions X1 and X2 that are capable of coming in contact with the rod 6. In the reciprocating saw 1, the cross-section of the rod 6 has no corners, and the depressed portions X1 and X2 of the upper roller 82 and the lower roller 83 have hourglass-like profiles. The reciprocating saw 1 is therefore equipped with a rod 6 orientation maintaining mechanism (reciprocating motion guidance mechanism) such that, as there are no corners in the cross-section of the rod 6, sealing characteristics are good. Furthermore, when considered from a microscopic perspective, contact of the upper roller 82 and the lower roller 83 with the rod 6 occurs such that there is point contact or contact over a short line segment therewith, and rotation occurs in such fashion that the rod 6 is guided to the deepest portion thereof which is at the depressed portions X1 and X2, so that seizing of parts is prevented.

Moreover, two rollers, i.e., the upper roller 82 and the lower roller 83, are provided, these being arranged in mutually opposing fashion in the top-to-bottom/bottom-to-top direction. This therefore makes it possible to achieve still more definitive establishment of maintenance of the rod 6, still further improvement in sealing characteristics and endurance, as well as prevention of seizing of parts.

Moreover, the roller left plate 86 and the roller right plate 87, which constrain movement in the axial directions of the upper roller 82 and the lower roller 83, are provided. This therefore allows to appropriately maintain the positions of the upper roller 82 and the lower roller 83, and to more definitively maintain the rod 6.

In addition, the cross-section of the rod 6 is circular. Not only is it therefore possible to easily achieve a cross-section in which there are no corners, but the profiles of the regions where contact is made with the upper roller 82 and the lower roller 83 are also made symmetric. Thus, the rod 6 is supported by the upper roller 82 and the lower roller 83 appropriately. Note that this operation and effect can also be achieved when the cross-section of the rod 6 is oval (elliptical).

Furthermore, the rod 6 engages in front-to-back/back-to-front reciprocating motion, and the upper roller 82 and the lower roller 83 come in contact with the rear portion of the rod 6 when it is positioned at the front end of the range of its reciprocating motion. The upper roller 82 and the lower roller 83 are therefore able to definitively support the rod 6 as it protrudes to the front in such fashion that the front end portion thereof is exposed.

Moreover, the rod 6 has the guide roller 68 which is guided by the left guide 69 and the right guide 70 at a back end portion thereof. This therefore makes it possible for the orientation of the rod 6 to be still more appropriately maintained.

Second Embodiment

Figure 16:
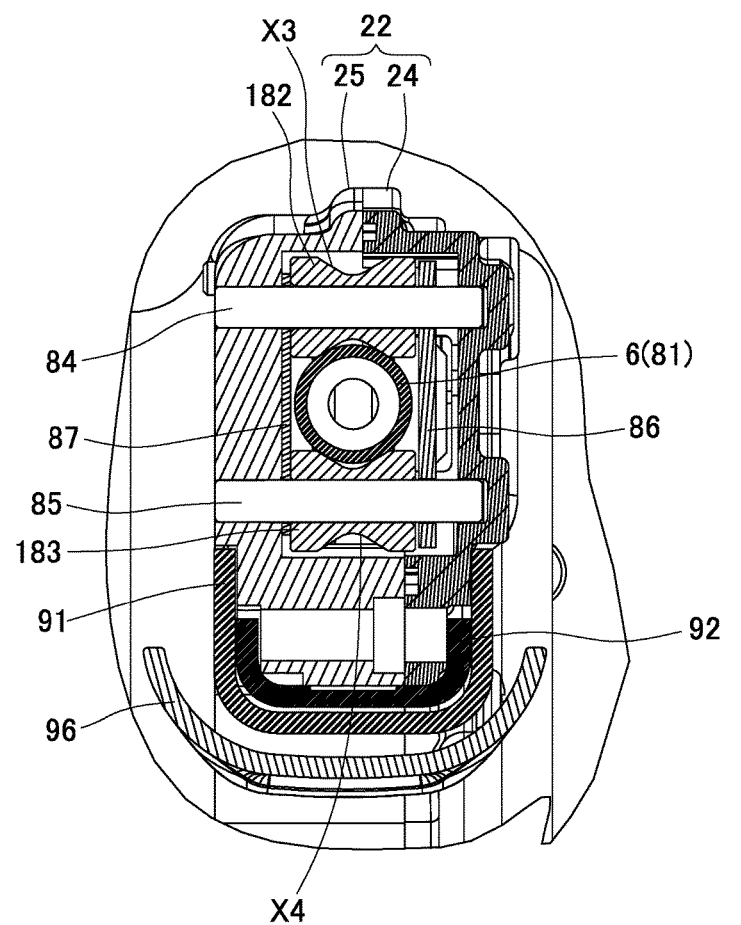
FIG. 16 is a drawing corresponding to FIG. 13 but showing a reciprocating saw associated with a second embodiment of the present invention.

FIG. 16 is a drawing which corresponds to FIG. 13 but which shows a reciprocating saw associated with a second embodiment of the present invention.

Except for the configuration of the upper roller and the lower roller, the reciprocating saw of the second embodiment is similar to the reciprocating saw 1 of the first embodiment. Where the constitution and the like of the reciprocating saw of the second embodiment are similar to that of the first embodiment, like reference numerals are assigned and description may be omitted where appropriate.

A depressed portion X3 at an upper roller 182 associated with the second embodiment has a shape such that a central portion in the left-to-right/right-to-left direction thereof is deeper than the depressed portion X1 of the first embodiment. In the second embodiment, contact with the rod base portion 81 occurs to either side of a region above that central portion. When considered from a microscopic perspective, contact is made therewith at two points or two short lines.

Furthermore, a depressed portion X4 at a lower roller 183 associated with the second embodiment has a shape such that a central portion in the left-to-right/right-to-left direction thereof is deeper than the depressed portion X2 of the first embodiment. In the second embodiment, contact with the rod base portion 81 occurs to either side of a region below that central portion. When considered from a microscopic perspective, contact is made therewith at two points or two short lines.

The reciprocating saw in accordance with the second embodiment is equipped with a motor 32, a drive transmission mechanism 4 that converts rotation of the motor 32 into reciprocating motion, a rod 6 that is connected to the drive transmission mechanism 4 and that engages in reciprocating motion, and an upper roller 182 and a lower roller 183 that are capable of rolling and that have depressed portions X3 and X4 that are capable of coming in contact with the rod 6. In the reciprocating saw in accordance with the second embodiment, the cross-section of the rod 6 has no corners, and the depressed portions X3 and X4 of the upper roller 182 and the lower roller 183 have hourglass-like profiles. The reciprocating saw is therefore equipped with a rod 6 orientation maintaining mechanism such that, when considered from a microscopic perspective, contact of the upper roller 182 and the lower roller 183 with the rod 6 occurs at two points or two short lines. As a result, the rod 6 is guided to the central portion in the left-to-right/right-to-left direction of the depressed portions X3 and X4, so that sealing characteristics are good, and seizing of parts is prevented.

Third Embodiment

Figure 17:
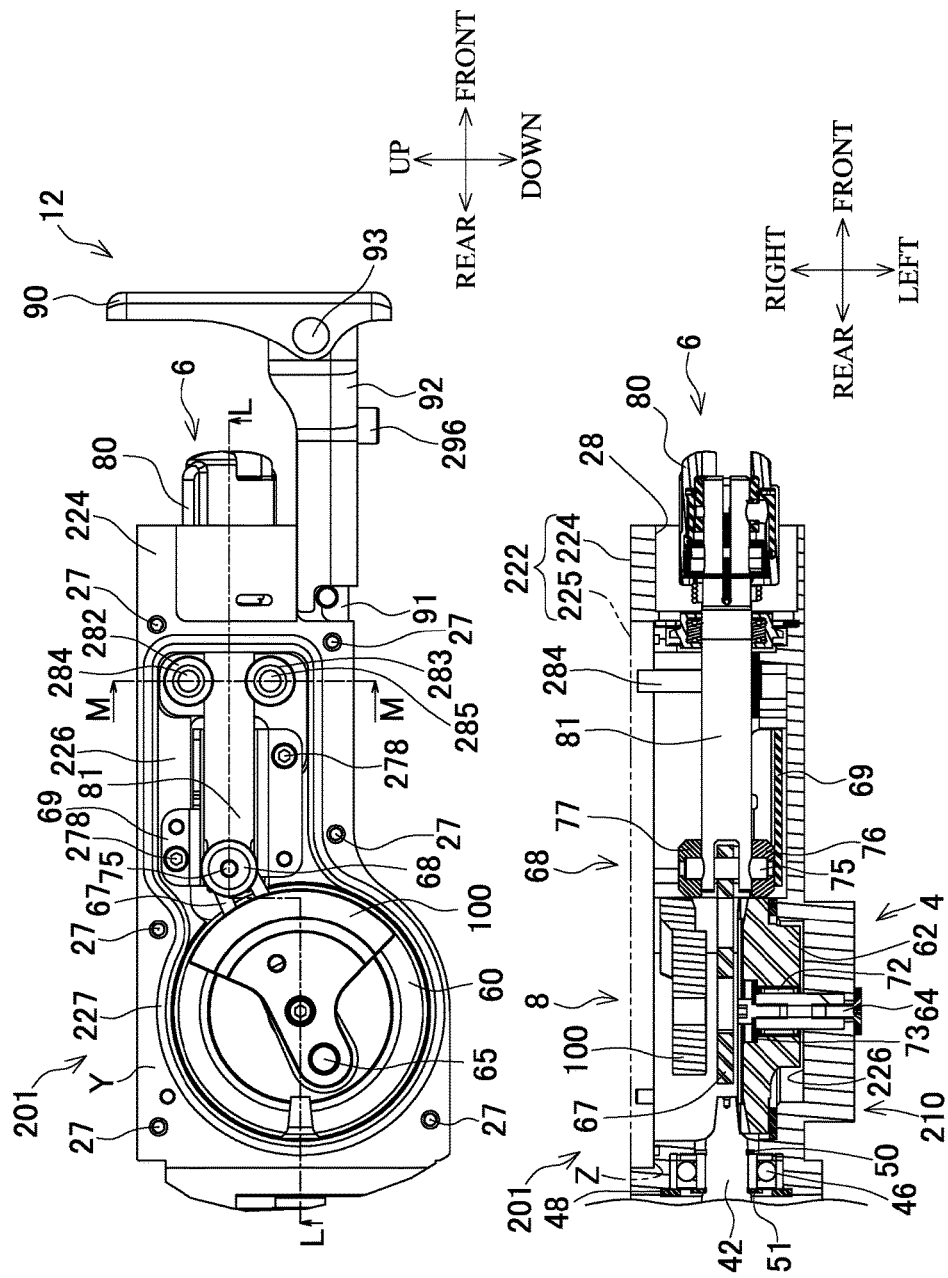
FIG. 17A is a right side view of a reciprocating saw associated with a third embodiment of the present invention in which an outer covering has been partially removed to reveal the components therebelow.
FIG. 17B is a sectional view (some components not being shown) of section L-L at FIG. 17A.
Figure 18:
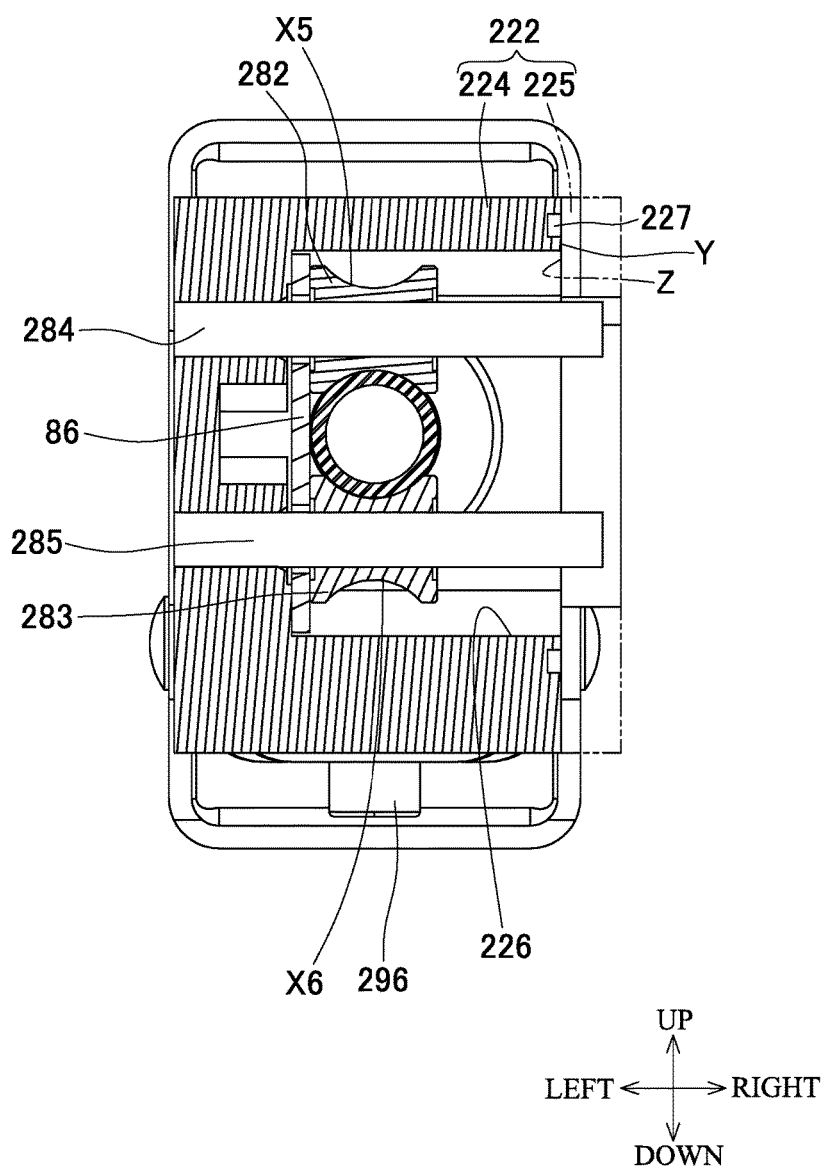
FIG. 18 is a sectional view of section M-M at FIG. 17A.

FIGS. 17A and 17B are a reciprocating saw 201 associated with a third embodiment of the present invention, in which FIG. 17A is a right side view thereof in which an outer covering has been partially removed to reveal the components therebelow, and FIG. 17B is a sectional view (some components not being shown) of section L-L at FIG. 17A. FIG. 18 is sectional view of section M-M at FIG. 17A.

Except for such aspects as the configuration of the upper roller and the lower roller, the configuration of the gear housing, the arrangement of the counterweight mechanism 8 relative to the drive transmission mechanism 4, and the means employed for securing the left guide and the shoe supporter, the reciprocating saw 201 of the third embodiment is similar to the reciprocating saw 1 of the first embodiment. Where the constitution and the like of the reciprocating saw 201 of the third embodiment are similar to that of the first embodiment, like reference numerals are assigned and description may be omitted where appropriate.

A depressed portion X5 at an upper roller 282 associated with the third embodiment has a shape that even more closely than the depressed portion X1 of the first embodiment matches the external shape of the rod base portion 81. In the third embodiment, when considered from a microscopic perspective, contact is made with the rod base portion 81 at a single point or a single short line, and at locations other than where that contact occurs the gap between the rod base portion 81 and the depressed portion X5 is smaller than the gap between it and the depressed portion X1 of the first embodiment.

Furthermore, depressed portion X6 at a lower roller 283 associated with the third embodiment has a shape that even more closely than the depressed portion X2 of the first embodiment matches the external shape of the rod base portion 81. In the third embodiment, when considered from a microscopic perspective, contact is made with the rod base portion 81 at a single point or a single short line, and at locations other than where that contact occurs the gap between the rod base portion 81 and the depressed portion X6 is smaller than the gap between it and the depressed portion X2 of the first embodiment.

Moreover, a gear housing 222 which serves as a conversion mechanism housing included within a housing 210 of the reciprocating saw 201 is divided into left and right sections such that it is equipped with a left gear housing portion 224 and a right gear housing portion 225. The left gear housing portion 224 which serves as a first conversion mechanism housing portion occupies the front portion, rear portion, and left portion of the gear housing 222. The right gear housing portion 225 which serves as a second conversion mechanism housing portion occupies the right portion of the gear housing 222. That is, the gear housing 222 is formed in such fashion that a region toward the right from the bathtub-shaped left gear housing portion 224 which is open to the right is covered by the right gear housing portion 225. The right gear housing portion 225 being smaller than the left gear housing portion 224, these are not split in the sense of being split into two mutually equal halves. By inserting screws, not shown, through screw holes 27, 27, . . . , the right gear housing portion 225 is secured by means of screws to the left gear housing portion 224.

A peripheral portion Y (portion toward the exterior from the bathtub-shaped recess portion 226 at which a bathtub-shaped recess is formed to the left) of the left gear housing portion 224 constitutes a plane (planar portion) that encloses the bathtub-shaped recess portion 226. A peripheral portion Z of the right gear housing portion 225 that faces the peripheral portion Y also constitutes a planar portion. In addition, sealing member 227 which is a linear elastic (e.g., elastomeric) body is installed at the peripheral portion Y of the left gear housing portion 224 so as to make one full revolution about and enclose the bathtub-shaped recess portion 226 of the left gear housing portion 224. The sealing member 227 comes in contact with the right gear housing portion 225 (the peripheral portion Z which is planar).

In addition, the counterweight mechanism 8 of the reciprocating saw 201 is arranged in a region that is toward the left from the drive transmission mechanism 4.

Furthermore, at the reciprocating saw 201, a left guide 69 is secured within the bathtub-shaped recess portion 226 of the left gear housing portion 224 by means of screws 278, 278 that pass through screw holes, not shown, provided at the left guide 69 to reach the left gear housing portion 224. Note that a right guide is not arranged at the reciprocating saw 201, an interior surface (the left face) of the right gear housing portion 225 serving as a right guide. Furthermore, in similar fashion as the right guide, a roller right plate is not arranged therein, the interior surface (the left face) of the right gear housing portion 225 serving as a roller right plate.

Moreover, at the reciprocating saw 201, a shoe supporter 92 is secured by means of a screw 296, the shoe lever being omitted.

The reciprocating saw 201 in accordance with the third embodiment is equipped with a motor 32, a drive transmission mechanism 4 that converts rotation of the motor 32 into reciprocating motion, a rod 6 that is connected to the drive transmission mechanism 4 and that engages in reciprocating motion, and an upper roller 282 and a lower roller 283 that are capable of rolling and that have depressed portions X5 and X6 that are capable of coming in contact with the rod 6. In the reciprocating saw 201 in accordance with the third embodiment, the cross-section of the rod 6 has no corners, and the depressed portions X5 and X6 of the upper roller 282 and the lower roller 283 have hourglass-like profiles. The reciprocating saw is therefore equipped with a rod 6 orientation maintaining mechanism such that, when considered from a microscopic perspective, contact of the upper roller 282 and the lower roller 283 with the rod 6 occurs at a single point or a single short line. As a result, the rod 6 is guided to the central portion in the left-to-right/right-to-left direction of the depressed portions X5 and X6, so that sealing characteristics are good, and seizing of parts is prevented.

Furthermore, the reciprocating saw 201 is equipped with the gear housing 222 at which the drive transmission mechanism 4 is arranged. The gear housing 222 includes the left gear housing portion 224 and the right gear housing portion 225 which are respectively equipped with the peripheral portions Y and Z. The peripheral portions Y and Z are planar portions that mutually overlap, and the peripheral portion Y is provided with the sealing member 227 which is an elastic body. The interior (bathtub-shaped recess portion 226) of the gear housing 222 is therefore sealed in definitive fashion.

Here, a portion of the invention related to the seal (peripheral portions Y and Z serving as planar portions and/or the sealing member 227) of the housing 210 (the gear housing 222) primarily associated with the third embodiment is indicated. The following modifications to the disclosed embodiments are encompassed by the present teaching:

(1) A reciprocating tool comprising:
a motor;
a reciprocating motion conversion mechanism that converts rotation of the motor into reciprocating motion;
a rod that is connected to the reciprocating motion conversion mechanism and that engages in reciprocating motion; and
a conversion mechanism housing at which the reciprocating motion conversion mechanism is arranged;
wherein the conversion mechanism housing is equipped with a plurality of conversion mechanism housing portions;
at least two of the conversion mechanism housing portions are equipped with planar portions that mutually overlap; and
at least one of the planar portions is provided with a sealing member which is an elastic body.

As the planar portion is provided with a sealing member, definitive achievement of sealing is made possible.

(2) A reciprocating tool according to (1) wherein at least one of the conversion mechanism housing portions that are provided with the planar portions is provided with a recessed portion that is surrounded by the planar portion.

Due to the fact that the recessed portion is enclosed by the planar portion, definitive sealing of the components and the like within the recessed portion is made possible.

(3) A reciprocating tool according to (1) or (2) wherein the planar portion is arranged at the periphery of the conversion mechanism housing portion.

The portion that is sealed is more or less the entire conversion mechanism housing portion.

Fourth Embodiment

Figure 19:
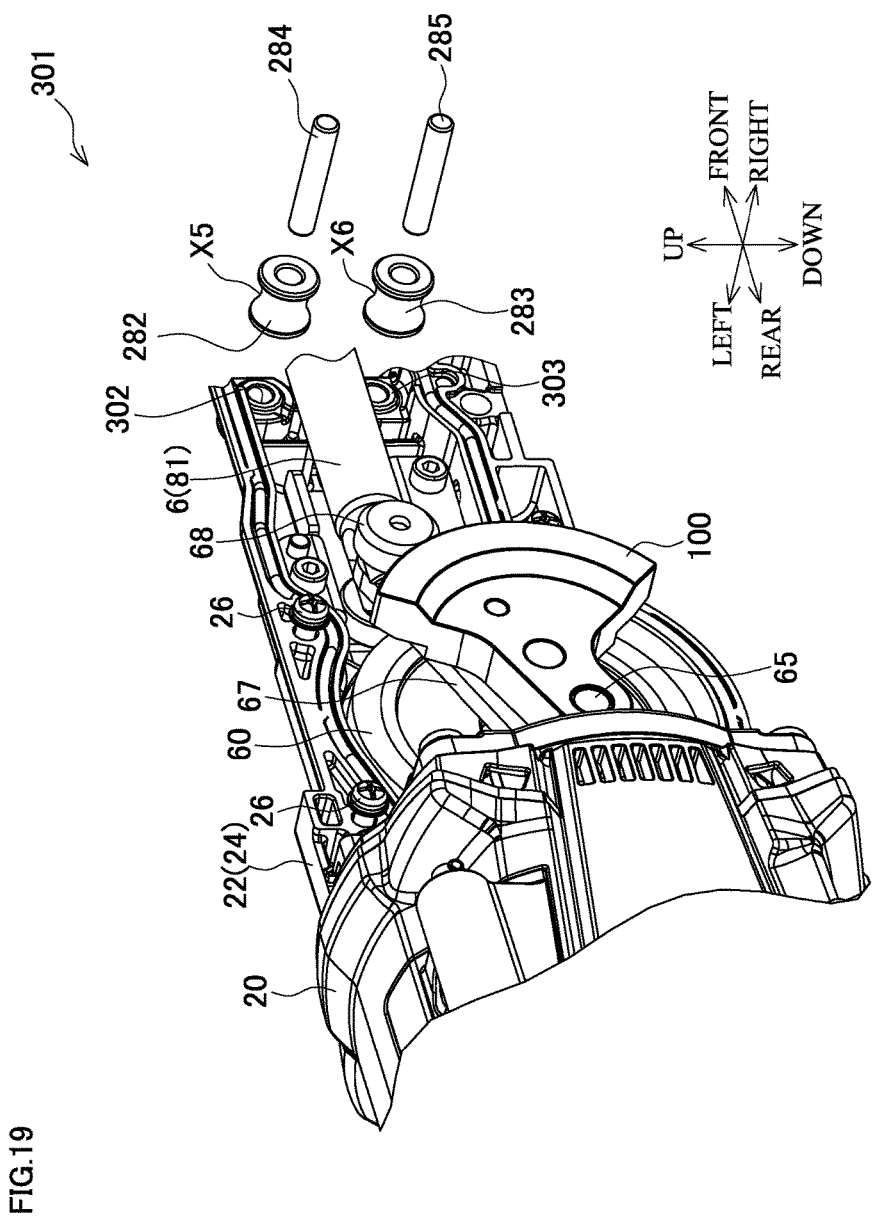
FIG. 19 is a perspective view of a reciprocating saw associated with a fourth embodiment of the present invention in which a portion at the front is shown in exploded fashion.
Figure 20:
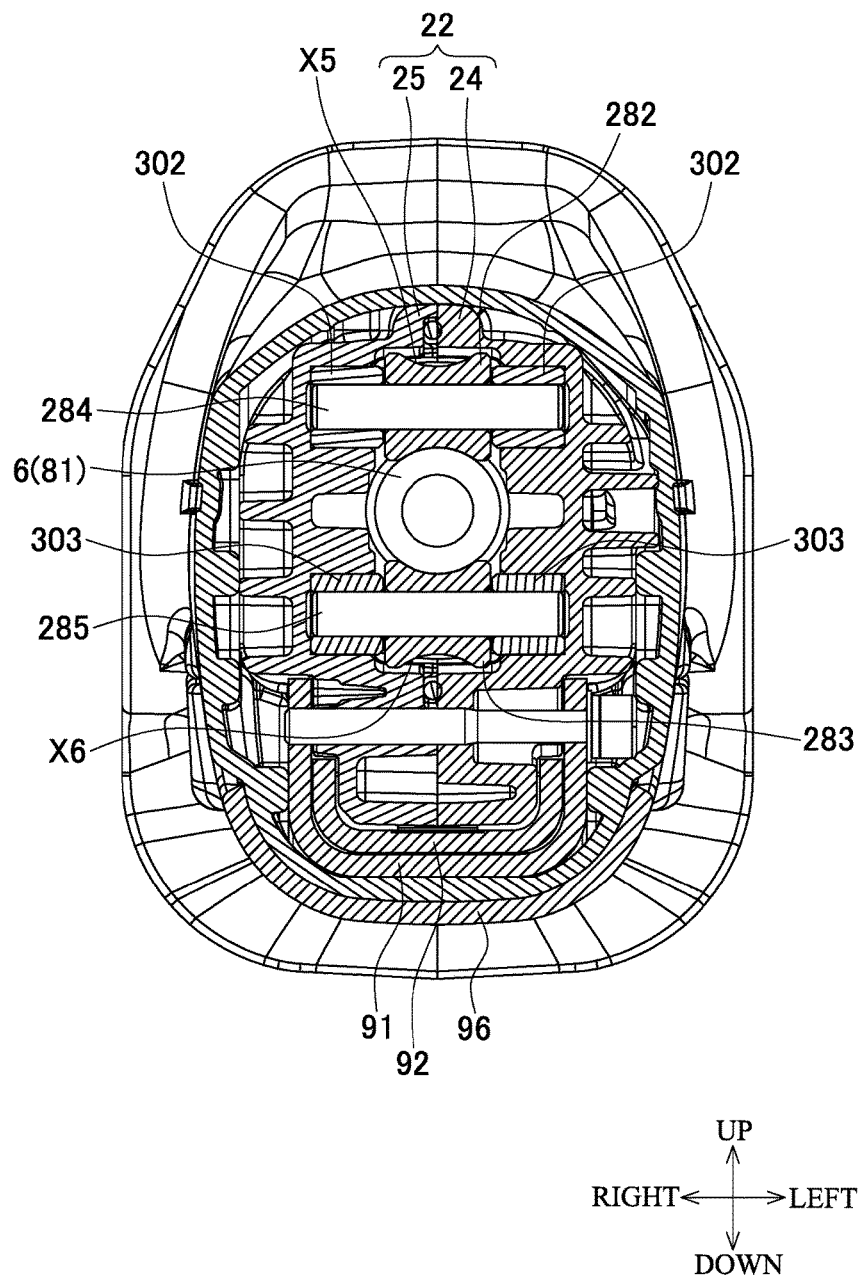
FIG. 20 is a drawing corresponding to FIG. 13 but showing a reciprocating saw associated with the fourth embodiment of the present invention.

FIG. 19 is a perspective view of a reciprocating saw 301 associated with a fourth embodiment of the present invention in which a portion at the front is shown in exploded fashion. FIG. 20 is a drawing which corresponds to FIG. 13 but which shows the reciprocating saw 301.

Except for the configuration of the depressed portions at the upper roller and the lower roller and the manner in which the upper roller shaft and the lower roller shaft are supported, the reciprocating saw 301 of the fourth embodiment is similar to the reciprocating saw 1 of the first embodiment. Where the constitution and the like of the reciprocating saw 301 of the fourth embodiment are similar to that of the first embodiment, like reference numerals are assigned and description may be omitted where appropriate.

At FIG. 19, note that the portion to the front of the right gear housing portion 25, the upper roller 282, and the lower roller 283 has been omitted.

The reciprocating saw 301 is equipped with an upper roller 282 and a lower roller 283 similar to those at the third embodiment. The upper roller 282 and the lower roller 283 have, in order, depressions X5 and X6.

The left portion of the upper roller shaft 284 is rotatably supported by the left gear housing portion 24 by way of a bearing (oilless bearing) 302. A roller left plate 86 not being provided, the right face of the bearing 302 comes in contact with the left face of the upper roller 282. The right portion of the upper roller shaft 284 at the reciprocating saw 301 is rotatably supported by the bearing 302 in the same fashion as the left portion thereof. A roller right plate 87 not being provided, the left face of the bearing 302 comes in contact with the right face of the upper roller 282. The upper roller shaft 284 is therefore rotatably supported by the bearings 302, 302, the bearings 302, 302 constituting rotatably supporting means for the upper roller shaft 284. Furthermore, the bearings 302, 302 constrain movement in the left-to-right/right-to-left direction with respect to the upper roller 282.

Furthermore, the lower roller shaft 285, like the upper roller shaft 284, is rotatably supported by bearings 303, 303, the bearings 303, 303 constituting rotatably supporting means for the lower roller shaft 285 and constraining movement in the left-to-right/right-to-left direction of the lower roller 283.

The reciprocating saw 301 in accordance with the fourth embodiment is equipped with a motor 32, a drive transmission mechanism 4 that converts rotation of the motor 32 into reciprocating motion, a rod 6 that is connected to the drive transmission mechanism 4 and that engages in reciprocating motion, and an upper roller 282 and a lower roller 283 that are capable of rolling and that have depressed portions X5 and X6 that are capable of coming in contact with the rod 6. In the reciprocating saw 301, the cross-section of the rod 6 has no corners, and the depressed portions X5 and X6 of the upper roller 282 and the lower roller 283 have hourglass-like profiles. The reciprocating saw 301 is therefore equipped with a rod 6 orientation maintaining mechanism such that, when considered from a microscopic perspective, contact of the upper roller 282 and the lower roller 283 with the rod 6 occurs at a single point or a single short line. As a result, the rod 6 is guided to the central portion in the left-to-right/right-to-left direction of the depressed portions X5 and X6, so that sealing characteristics are good, and seizing of parts is prevented.

Furthermore, the reciprocating saw 301 is equipped with a gear housing 22 at which the drive transmission mechanism 4 is arranged, the upper roller 282 and the lower roller 283 are supported so as to be capable of rolling around an upper roller shaft 284 and a lower roller shaft 285, and the upper roller shaft 284 and the lower roller shaft 285 are rotatably supported with respect to the gear housing 22 by the bearings 302, 303. Accordingly, even if the upper roller 282 or the lower roller 283 should become incapable of rolling relative to the upper roller shaft 284 or the lower roller shaft 285 due to some unforeseen lockup or the like, it will still be possible for rotation to occur at the upper roller shaft 284 and the lower roller shaft 285. The guidance function (orientation maintaining function) of the rod 6 will still be maintained, preventing occurrence of seizure of parts at the upper roller 282 and the lower roller 283, and at the upper roller shaft 284 and the lower roller shaft 285, as well as at the rod 6, and improving endurance of the reciprocating saw 301.

Variations

Note that the present invention is not limited to the foregoing embodiments, for example, variations such as the following may be adopted as appropriate.

There may be one roller or there may be three or more rollers, where a plurality thereof are provided, these may be arranged at left and right, and it is also possible to arrange these at locations that are not mutually opposed, and it is also possible for these to be such that only the depressed portion(s) of a portion of the roller(s) have cross-sectional shape(s) similar to some portion of the external shape of the cross-section of the rod. Furthermore, it is also possible to employ in combination at least any two among the rollers at the first embodiment, the rollers at the second embodiment, and the rollers of the third embodiment.

The cross-section of the rod may be oval or ovate, or may be in the shape of a prism having rounded corners, or the like.

The drive transmission mechanism (reciprocating motion conversion mechanism) may be such that it is equipped with a crank or the like.

Roller retainer(s) may be arranged at top and bottom, or there may be one or three or more thereof.

The left gear housing portion and the right gear housing portion may be split in the sense of being split into two mutually equal halves. Sealing member(s) may be provided at the right gear housing portion, or may be provided at the left gear housing portion and the right gear housing portion. Furthermore, sealing member(s) may be provided at at least one of the planar portion of the main housing and the planar portion at the gear housing which overlaps the planar portion of the main housing.

A wide variety of variations are possible with regard to the counterweight mechanism, in which balancer(s) may be arranged at left and right of the gear and/or the rotating portion, or this may be completely omitted, and so forth.

A wide variety of variations are possible with regard to the number, materials and/or shapes, types, and so forth of any of the various components, or whether any thereamong are present or absent. It is possible to vary the number of or omit the (thin-walled) recessed portion(s) at the rotating portion, to employ a ball bearing instead of a needle bearing, to vary the number of compartments of the housing and/or the shapes of the various portions, and so forth.

The blade may have cutting features(s) other than saw teeth.

Electricity may be supplied by means of a battery instead of by means of an electric power cord, and such a battery might be capable of being installed at the main housing or the like.

With respect to the bearings at the fourth embodiment, these may be constituted from needle bearings instead of oilless bearings. At the fourth embodiment, at least one of the roller shafts may be rotatably supported by means other than a bearing. At the fourth embodiment, it is possible to cause only one of the roller shafts to be rotatably supported, and to cause the other roller shaft to be supported as a result of a press-fit arrangement or the like.

At the fourth embodiment and in fact any of the various embodiments, bearing(s) may be arranged between roller(s) and roller shaft(s). Where this is the case, the roller(s) will roll more smoothly, and will therefore more smoothly guide the rod, and it will be possible to prevent occurrence of seizure of parts at the rod, roller(s), and roller shaft(s), and endurance will be improved.

The present invention may be applied to reciprocating cutting tools other than reciprocating saws (e.g., jigsaws), and may be applied to reciprocating tools other than reciprocating cutting tools.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A reciprocating cutting tool comprising:
   a motor with a rotational output;
   a reciprocating motion conversion mechanism operatively connected to the motor;

a rod that is connected to and driven by the reciprocating motion conversion mechanism to reciprocate linearly along its entire length; and a roller that is capable of rolling and that has a contacting surface configured to contact the rod, wherein:

a cross-section of the rod has no corners;

the roller has a longitudinal axis and a shape of a spool such that the contacting surface is an exterior surface of the roller between ends of the roller that, in cross section along the longitudinal axis of the roller, (1) has a maximum distance from the longitudinal axis of the roller at the ends of the roller, (2) has a minimum distance from the longitudinal axis of the roller at the midpoint of the exterior longitudinal surface, and (3) is an arcuate surface between the maximum distance and the minimum distance;

the rod has a longitudinal axis that is a straight line;

the reciprocating motion conversion mechanism includes (1) a rotating gear with a rotation axis perpendicular to the longitudinal axis of the rod and (2) a shaft in the rotating gear that is operatively connected to the rod to cause the rod to reciprocate and has a longitudinal axis that is parallel to but offset from the rotation axis of the rotating gear.

2. The reciprocating cutting tool according to claim 1, wherein the roller is one of a plurality thereof that are provided and that are arranged in mutually opposing fashion.

3. The reciprocating cutting tool according to claim 1, wherein a movement-constraining plate is provided that constrains movement in an axial direction of the roller.

4. The reciprocating cutting tool according to claim 1, wherein the cross-section of the rod is circular or oval.

5. The reciprocating cutting tool according to claim 1, wherein the rod engages in front-to-back and back-to-front reciprocating motion; and the roller comes in contact with a rear portion of the rod when the rod is positioned at a front end of a range of reciprocating motion of the rod.

6. The reciprocating cutting tool according to claim 1 further comprising:

a conversion mechanism housing at which the reciprocating motion conversion mechanism is arranged, wherein the conversion mechanism housing is equipped with a plurality of conversion mechanism housing portions;

at least two of the conversion mechanism housing portions are equipped with planar portions that mutually overlap; and at least one of the planar portions is provided with a sealing member which is an elastic body.

7. The reciprocating cutting tool according to claim 1, wherein the rod has, at a back end portion thereof, a guide roller that is guided by a guide.

8. The reciprocating cutting tool according to claim 1 further comprising:

a conversion mechanism housing at which the reciprocating motion conversion mechanism is arranged, wherein the roller is supported so as to be capable of rolling around a roller shaft; and the roller shaft is rotatably supported with respect to the conversion mechanism housing.

9. The reciprocating cutting tool according to claim 8, wherein the roller shaft is rotatably supported by an oilless bearing.

10. The reciprocating cutting tool according to claim 1, wherein the reciprocating motion conversion mechanism includes a slider having first and second ends;

the first end of the slider is attached to the shaft;

and the second end of the slider is attached to a guide roller that moves along a path that is parallel to the longitudinal axis of the rod.

11. The reciprocating cutting tool according to claim 10, wherein the guide roller comprises two side rollers.

12. The reciprocating cutting tool according to claim 1, wherein:

the reciprocating motion conversion mechanism includes a link having a first end connected to the rotating gear and a second end connected to the rod; and the first end of the link is connected to the rotating gear at a location offset from the rotation axis of the rotating gear.

13. The reciprocating cutting tool according to claim 1, further comprising:

a conversion mechanism housing at which the reciprocating motion conversion mechanism is arranged;

wherein the inner roller is rotatably supported with respect to the conversion mechanism housing.

14. The reciprocating cutting tool according to claim 13, wherein the inner roller is rotatably supported by an oilless bearing.

15. A reciprocating cutting tool comprising:

a motor with a rotational output;

a reciprocating motion conversion mechanism operatively connected to and driven by the motor;

a rod that is connected to and driven by the reciprocating motion conversion mechanism to reciprocate linearly along its entire length;

a roller assembly configured to contact the rod and direct the rod in a linear direction as the rod reciprocates; and a housing that houses the reciprocating motion conversion mechanism, the rod and the roller assembly;

wherein:

the rod has a longitudinal axis that is a straight line;

the reciprocating motion conversion mechanism includes (1) a rotating gear with a rotation axis perpendicular to the longitudinal axis of the rod and (2) a shaft in the rotating gear that is operatively connected to the rod to cause the rod to reciprocate and has a longitudinal axis that is parallel to but offset from the rotation axis of the rotating gear;

an outer roller rotatably surrounding the inner roller; wherein the outer roller engages the rod; and wherein the outer roller has (a) a longitudinal axis, (b) a contacting surface configured to contact the rod, and (c) a shape of a spool such that the contacting surface is an exterior surface of the outer roller between ends of the outer roller that, in cross section along the longitudinal axis of the outer roller, (1) has a maximum distance from the longitudinal axis of the outer roller at the ends of the outer roller, (2) has a minimum distance from the longitudinal axis of the outer roller at the midpoint of the exterior longitudinal surface, and (3) is an arcuate surface between the maximum distance and the minimum distance.

16. The reciprocating cutting tool according to claim 15, wherein the reciprocating cutting tool includes two of the roller assembly arranged in mutually opposing fashion.

17. The reciprocating cutting tool according to claim 15, wherein a movement-constraining plate is provided that constrains movement of the outer roller in an axial direction of the outer roller.

18. The reciprocating cutting tool according to claim 15, wherein the cross-section of the rod is circular or oval.

19. The reciprocating cutting tool according to claim 15, wherein:
   the rod engages in front-to-back and back-to-front reciprocating motion; and
   the roller assembly comes in contact with a rear portion of the rod when the rod is positioned at a front end of a range of reciprocating motion of the rod.

20. The reciprocating cutting tool according to claim 15, further comprising:
   a conversion mechanism housing at which the reciprocating motion conversion mechanism is arranged,
   wherein the conversion mechanism housing is equipped with a plurality of conversion mechanism housing portions;
   at least two of the conversion mechanism housing portions are equipped with planar portions that mutually overlap; and
   at least one of the planar portions is provided with a sealing member which is an elastic body.

21. The reciprocating cutting tool according to claim 15, wherein the rod has, at a back end portion thereof, a guide roller that is guided by a guide.

* * * * *